(12) United States Patent
Smith et al.

(10) Patent No.: US 12,161,219 B2
(45) Date of Patent: Dec. 10, 2024

(54) CLEANING BRISTLE BRUSHES AND CLEANING SYSTEMS USING SAME

(71) Applicant: Jud Smith, Greencastle, IN (US)

(72) Inventors: Judson Smith, Greencastle, IN (US); Zachary Bradford Smith, Tempe, AZ (US)

(73) Assignee: Judson Smith, Greencastle, IN (US)

( * ) Notice: Subject to any disclaimer, the term of this patent is extended or adjusted under 35 U.S.C. 154(b) by 346 days.

(21) Appl. No.: 17/591,041

(22) Filed: Feb. 2, 2022

(65) Prior Publication Data

US 2022/0240662 A1 Aug. 4, 2022

Related U.S. Application Data

(60) Provisional application No. 63/145,667, filed on Feb. 4, 2021, provisional application No. 63/145,230, filed on Feb. 3, 2021.

(51) Int. Cl.
| | |
|---|---|
| *A46B 3/06* | (2006.01) |
| *A46B 3/08* | (2006.01) |
| *A46B 7/02* | (2006.01) |
| *A46B 9/06* | (2006.01) |
| *A46B 9/10* | (2006.01) |

(Continued)

(52) U.S. Cl.
CPC .............. *A46D 1/0261* (2013.01); *A46B 3/08* (2013.01); *A46B 7/026* (2013.01); *A46B 9/06* (2013.01); *A46B 9/10* (2013.01); *A46D 1/0238* (2013.01); *A46B 2200/3046* (2013.01); *B60S 3/045* (2013.01); *B60S 3/063* (2013.01)

(58) Field of Classification Search
CPC ............ A46B 3/08; A46D 1/0261; B60S 3/06
See application file for complete search history.

(56) References Cited

U.S. PATENT DOCUMENTS

| | | |
|---|---|---|
| 120,791 A | 11/1871 | Spellman |
| 564,497 A | 7/1896 | Babis |

(Continued)

FOREIGN PATENT DOCUMENTS

| | | |
|---|---|---|
| CN | 101695434 | 4/2010 |
| DE | 20104007 | 6/2001 |

(Continued)

*Primary Examiner* — Michael D Jennings
(74) *Attorney, Agent, or Firm* — Woodard, Emhardt, Henry, Reeves & Wagner, LLC

(57) ABSTRACT

A brush useful for washing external surfaces, such as of a vehicle. The brush comprises a plurality of bristles connected to a hub. Each bristle has an elongated shaft having a number of cleaning structures extending outwardly from the shaft, providing multiple faces and edges arranged in a circumferential manner around the shaft, and producing multiple washing actions by the bristles as they are moved adjacent the surface. The hub and bristles may be integrally molded in a first condition having a planar form, and then folded relative to the hub to position the bristles extending from the hub in a cleaning direction from the hub. The hubs are secured to mounting structures by reception of the hubs in apertures in the mounting structures. In an embodiment, the mounting surfaces comprise flexible stanchions which are moved relative to an external surface to provide high resolution washing of a vehicle surface.

8 Claims, 19 Drawing Sheets

(51) Int. Cl.
  *A46D 1/00* (2006.01)
  *B60S 3/04* (2006.01)
  *B60S 3/06* (2006.01)

(56) References Cited

U.S. PATENT DOCUMENTS

| | | | |
|---|---|---|---|
| 684,203 A | 10/1901 | Eaton | |
| 1,298,096 A | 3/1919 | Roberts | |
| 1,803,086 A | 4/1931 | Allen | |
| 1,824,994 A | 9/1931 | Herold et al. | |
| 1,908,788 A | 5/1933 | Pulliam | |
| 2,215,692 A | 9/1940 | Fleming | |
| 2,644,181 A | 7/1953 | Lazarus et al. | |
| 2,754,531 A | 7/1956 | Rowland | |
| 2,773,275 A | 12/1956 | Peterson | |
| 2,807,820 A | 10/1957 | Dinhofer | |
| 2,825,080 A | 3/1958 | Bongiovanni | |
| 3,089,168 A | 5/1963 | Blanford | |
| 3,237,232 A | 3/1966 | Holley | |
| 3,393,418 A * | 7/1968 | Mundo | A47L 17/00 15/179 |
| 3,487,490 A | 1/1970 | Wuster | |
| 3,693,206 A | 9/1972 | Tatara et al. | |
| 3,698,405 A | 10/1972 | Walker | |
| 3,761,986 A | 10/1973 | Rickel | |
| 3,909,868 A * | 10/1975 | Nogues | A46B 13/08 219/222 |
| 4,096,600 A | 6/1978 | Belanger | |
| 4,276,674 A * | 7/1981 | Hunt | A46B 9/12 15/182 |
| 4,320,551 A | 3/1982 | Roncaglione | |
| 4,373,541 A | 2/1983 | Nishioka | |
| 4,417,826 A * | 11/1983 | Floros | A46B 13/06 401/184 |
| 4,510,639 A | 4/1985 | Roncaglione | |
| 4,876,157 A | 10/1989 | Barman | |
| 5,058,231 A * | 10/1991 | Lowe | A46B 3/14 15/182 |
| 5,358,311 A * | 10/1994 | Drumm | A46B 13/005 300/21 |
| 5,511,274 A | 4/1996 | Lewis | |
| 5,623,741 A | 4/1997 | Gaylord | |
| 5,687,446 A | 11/1997 | Chen et al. | |
| 5,903,951 A | 5/1999 | Ionta et al. | |
| 5,951,113 A * | 9/1999 | Lewis, Jr. | A46D 3/045 15/171 |
| 6,202,279 B1 | 3/2001 | Belanger et al. | |
| 6,391,445 B1 | 5/2002 | Weihrauch | |
| 6,564,418 B1 * | 5/2003 | Favagrossa | A46B 13/001 15/230.16 |
| 6,725,492 B2 * | 4/2004 | Moore | B08B 9/0436 15/104.16 |
| 7,017,223 B2 | 3/2006 | Clark | |
| 7,219,385 B1 | 5/2007 | Rietsch | |
| 7,805,798 B2 * | 10/2010 | Belanger | A46B 13/02 15/53.2 |
| D707,405 S | 6/2014 | Kaady | |
| 9,067,655 B1 * | 6/2015 | Fusco | A46B 3/00 |
| 9,326,591 B2 * | 5/2016 | Nicoline | A46B 9/023 |
| 9,802,582 B2 * | 10/2017 | Favagrossa | A46B 7/10 |
| 10,369,973 B2 | 8/2019 | Belanger et al. | |
| 10,517,388 B2 * | 12/2019 | Perez | A46D 1/0261 |
| 10,549,728 B1 | 2/2020 | Fitzsimmons | |
| 10,702,057 B2 | 7/2020 | Xi et al. | |
| 10,717,419 B2 * | 7/2020 | Belanger | B60S 3/063 |
| 2002/0065031 A1 | 5/2002 | Chou et al. | |
| 2002/0132572 A1 | 9/2002 | Lageson et al. | |
| 2004/0010878 A1 * | 1/2004 | Levesque | A46B 13/005 15/53.2 |
| 2004/0112400 A1 | 6/2004 | Kurek | |
| 2005/0172431 A1 | 8/2005 | Kohlruss et al. | |
| 2006/0080799 A1 | 4/2006 | Lucente | |
| 2007/0193597 A1 * | 8/2007 | Hurwitz | A46B 11/0041 132/114 |
| 2008/0083421 A1 * | 4/2008 | Malvar | B29C 53/02 15/207.2 |
| 2008/0250594 A1 | 10/2008 | Green | |
| 2009/0250993 A1 * | 10/2009 | Vivyan | A46B 13/003 15/53.1 |
| 2011/0289717 A1 | 12/2011 | Dhanvanthari | |
| 2013/0104332 A1 * | 5/2013 | Belanger | A46B 13/001 15/246 |
| 2014/0366290 A1 * | 12/2014 | Belanger | B60S 3/06 15/53.1 |
| 2015/0047136 A1 * | 2/2015 | Bernardi Pirini | B60S 3/06 15/53.3 |
| 2015/0210252 A1 * | 7/2015 | Belanger | A46B 13/001 15/186 |
| 2017/0311711 A1 | 11/2017 | Sorrentino | |
| 2018/0317640 A1 | 11/2018 | Holding | |
| 2019/0045912 A1 * | 2/2019 | Mikitovic | A46B 9/023 |
| 2019/0104912 A1 | 4/2019 | Amicon | |
| 2019/0246778 A1 | 8/2019 | Holding | |
| 2019/0281971 A1 * | 9/2019 | Perez | A46D 1/0261 |
| 2021/0179034 A1 | 6/2021 | Yamin, Sr. et al. | |

FOREIGN PATENT DOCUMENTS

| | | |
|---|---|---|
| DE | 20106592 | 7/2001 |
| DE | 102011007326 | 10/2012 |
| EP | 2517603 | 10/2012 |
| EP | 2 959 799 | 5/2017 |
| KR | 20080004107 | 9/2008 |
| KR | 10-2158951 | 9/2020 |
| WO | WO 90/01281 | 2/1990 |
| WO | WO 2020/164242 | 8/2020 |
| WO | WO 2020/197789 | 10/2020 |

* cited by examiner

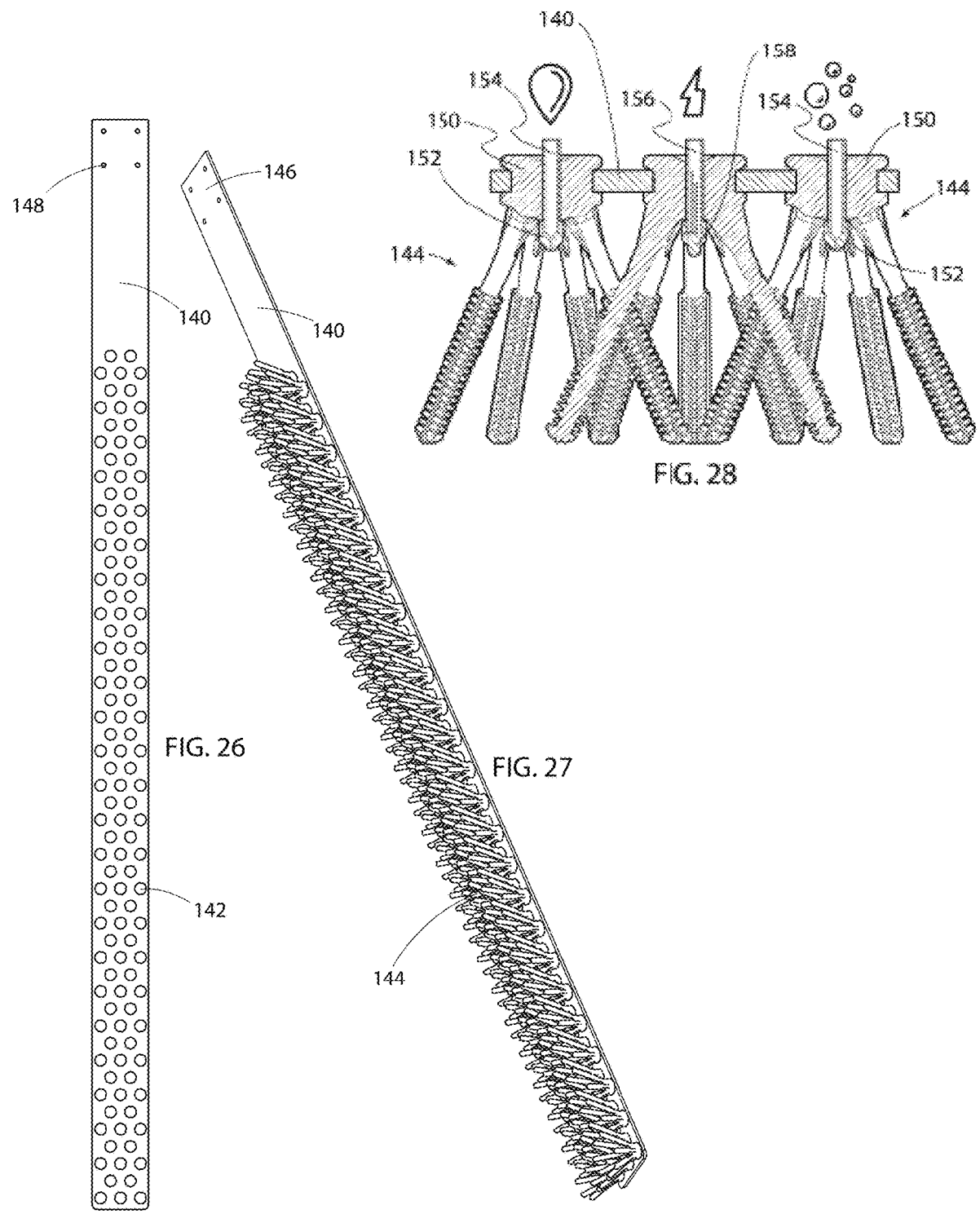

CLEANING BRISTLE BRUSHES AND CLEANING SYSTEMS USING SAME

FIELD OF THE INVENTION

This invention relates to the design, manufacture and use of cleaning brushes and more particularly bristle brushes including a hub and several outwardly extending bristles. In a particular aspect, the brushes are injection molded and include bristles having projecting cleaning structures presenting multiple cleaning edges. The brushes may comprise an assembly of separate components, or may be formed as an integral, one-piece unit. In one aspect, the brushes are produced by folding a planar brush precursor to reposition the bristles relative to the hub. The brushes may include integral structures for facilitating attachment to a support structure. The brushes are well suited for use in cleaning a variety of surfaces, and have a particular application in the washing and cleaning of vehicles.

BACKGROUND OF THE DISCLOSURE

The art is well known relative to automatic vehicle washing. Such systems typically use rotating brushes and hang-down mitting curtains, which collectively have become the preferred industry standard equipment for automatically washing vehicles. The prior art discloses using a variety of cleaning materials for rotating brushes and hang-down mitting curtains, including polyethylene and polypropylene extruded strands, strips of synthetic felt, plastic fabric, and open and closed cell foam plastic. Even the use of cardboard and leather-board in rotating brushes has been disclosed as washing elements.

It is apparent from the prior art that a continuing objective in new developments for bristle brush arrangements has been to achieve and maintain good cleaning action from the tip speed and contact of the bristle tip ends with the surface being cleaned. For example, orbital type movement of the bristle tips of a toothbrush has long recommended as part of dental hygiene guidance.

As shown in the art, this objective is easier to achieve with rotating brushes when they are used in cleaning flat or uniform type surfaces (e.g., street sweeping brushes) and can be rotated at relatively high speeds, e.g., 100-120 RPMs. However, it has always been difficult for automatic vehicle washing systems to use rotating bristle type brushes to properly and safely wash a vehicle. This is because vehicle shapes, sizes, and types of exterior painted surfaces and coatings represent extraordinary challenges for automatic vehicle washing equipment employing rotating brushes. It is important to achieve the proper tip speed and contact of rotating bristle brush tips. Also, the brushes must be gentle and soft, and be able to closely follow and penetrate the intricate contours of the various types of vehicles. If the rotating brushes do not operate in a precise manner, i.e., proper rotational speed and brush crush, vehicle damage can result, including: micro hazing and marring of the vehicle's exterior painted and coated surfaces; damage to antennae; and damage to mirrors. Also, the rotating cylinder housings which hold the brush strips are generally made of aluminum or stainless steel and are quite heavy once the wash media is attached. They are also costly to manufacture and maintain.

More recent prior art discloses means for rotating brushes using different bristle media consisting in part of felt, cotton and polyester woven fabric, foam, and closed cell foam. These types of materials can be rotated at much slower speeds, typically 60-100 RPMs, and can be configured to include multiple cleaning edges to help penetrate the recessed areas of vehicles. The prior art discloses very unique ways to incorporate differently configured washing media into a rotating brush, and also addresses the rotational requirements by achieving varying rotational RPM's of a brush.

Vehicle washes use single direction rotary type brushes that perform best when rotary brushes wash with the tips of the bristles. However, rotary type brushes frequently miss areas of the car's exterior surface, e.g., recessed windows, louvers, mirrors, moldings, etc.,—because their inherent single direction rotation and inconsistent "crush" pressure causes overlaps that do not allow for consistent bristle tip cleaning of the stated areas.

Additionally, the prior art relating to hang-down mitting curtains is also extensive. The art relates to both the mechanical movement of mitting curtains for improved agitating type washing actions, and the material and design configurations of the curtains to provide better vehicle washing of the irregularities of vehicle surfaces. There is further but limited prior art which discloses complex means for rotating, reciprocating and oscillating type vehicle washing brush media, vibrating brush media, and flexible brushes.

Although advancements in automatic vehicle washing equipment have been significant over the years, there still remain many problem areas that need improvement. These problem areas include vehicle damage caused by rotating brushes; overuse of water and chemicals by the rotating brushes flinging solution away from the vehicle due to the centrifugal action of the rotating brushes; excessive noise caused by the rotating brush actions and mitting curtains which cause a slapping effect against the vehicle; parts of the vehicle remaining uncleaned due to missing washing actions caused by rotating brushes rotating in only one direction and being unable to consistently clean with its bristle tips, frequently overlapping recessed parts of the vehicle's surfaces; excessive use of electrical power; complex multiple pieces of washing equipment being required; equipment wear, with replacement and repair being costly and time consuming; and original capital investment required for automatic vehicle washing equipment, buildings, and land.

This disclosure effectively addresses these problem areas with novel improvements that will be readily apparent through the reading and understanding of the following summary and description of the invention.

SUMMARY OF THE DISCLOSURE

This disclosure relates to the design, production and use of brushes comprising a hub and multiple, outwardly-extending bristles. The brushes in embodiments include several bristles which extend equiradially from a hub at an acute angle to the central axis of the hub. The bristles include a large number of nubs which extend from the shaft of the bristle. The disclosure includes brushes formed as an assembly of components, or as an integrated, optionally molded, one-piece unit. In an embodiment, the brushes are formed by molding the hub and bristles in a planar form and then folding the bristles to their final position. The brushes include structures configured for mounting to an external support. The disclosure further describes methods of making the brushes, brushing apparatus including the brushes, and systems using the brushing apparatus.

The present invention in one aspect is directed to a brush comprising a hub and a plurality of bristles attached thereto, each bristle including an elongated shaft extending from a proximal end to a distal tip, and each bristle having the proximal end attached to the hub. The bristles extend from the hub at an acute angle to the central axis of the hub, and each bristle has an array of multiple cleaning structures extending outwardly from the shaft. In embodiments, the hub and/or the bristles form an annular recess or other structure which receives a variety of support structures.

In another aspect, the brushes are formed from a molded brush precursor. The brush precursor provides a cylindrical hub and bristles in a first position in which each of the bristles extends radially, preferably equiradially, from the hub in a plane orthogonal to the central axis of the hub. The hub and bristles have a second position in which the bristles extend at an acute angle relative to the central axis of the hub. In a method of making a brush, the hub and bristles are formed integrally with the bristles extending coplanar with the hub, and the brush is formed by folding the bristles from the first position to the second position. The bristles are then locked in the second position. In one embodiment, the hub and/or bristles form an annular recess and a locking component is received within the recess. The locking component may comprise, for example, a ring-shaped locking collar, or it may include a webbing including an aperture which receives the annular recess of the brush which is inserted while in the second position.

The brushes are useful in a variety of applications. The brushes may be received within differing types of support structures adapted for particular uses. For example, the support structure may simply be a locking collar received by the annular recess. A number of alternative support structures and applications are disclosed herein, although these are not to be taken as limiting.

In a particular application, an array of a number of the brushes is mounted to vertically-extending, flexible stanchions. These stanchions are arranged adjacent one another, and are moved vertically to function as a washing system for vehicles. In this application, an object of the invention is to provide a soft bristle brush arrangement for the washing of vehicles, particularly one that is vehicle-friendly and which eliminates the conventional rotating of the brushes for cleaning.

The stanchion-mounted bristle brush assemblies are moved against the vehicle's exterior surfaces. The stanchion movements include vibratory oscillation; up-and-down scrubbing; in-and-out scrubbing; and side-to-side scrubbing. These all constitute vehicle-friendly movements replicating much the same as a person would perform when carefully washing a vehicle with a soft cloth wash mitt or brush. The described washing movements using multiple soft flexible bristle brushes are also worker-friendly, because they do not include rotating type brushes.

Another preferred aspect of the disclosure is a bristle brush having integral attachment means that securely fastens the brush to a material such as a composited stanchion without requiring any additional hardware. In general, the brushes may comprise any common locking feature such as those using complementary shapes providing a form, press or snap fit.

A further aspect of the disclosed brushes is an injection molded, multiple bristle brush as described herein produced as a single part that does not require additional manufacturing or processing for its assembly or installation as a brush, representing a significant cost savings with injection molded bristle brush manufacturing. The brushes do not require tufting, stapling, fusing, bonding, channeling, or crimping that are common sub-assembly types of manufacturing processes associated with other forms of multi-step bristle brush manufacturing.

The foregoing and other uses, features and advantages of the present invention will be apparent from the following more detailed description of the particular embodiments of the invention, as illustrated in the accompanying drawings.

BRIEF DESCRIPTION OF THE DRAWINGS

FIG. 26 is a front view of an exemplary embodiment of a linear type of stanchion with openings to receive brushes, and useful for example in a vehicle washing system.

FIG. 27 is a perspective view of the stanchion of FIG. 26 populated with brushes.

FIG. 28 is a partial, cross-sectional side view showing a stanchion containing brushes incorporating water and solution type nozzles, and LED lighting.

DETAILED DESCRIPTION OF THE DISCLOSURE

Disclosed herein are brushes providing uniquely advantageous cleaning of surfaces. The bristles of the disclosed brushes have circumferential cleaning edges which provide high-resolution surface cleaning using less water, less chemicals, less energy, and without causing damage. The brushes comprise a number of bristles including shafts extending outwardly from a hub. A variety of cleaning structures are positioned on the shafts. The brushes are secured to support structures for moving the brushes against surfaces to be cleaned. The brushes in certain embodiments are particularly adapted for use in the cleaning of vehicles in an automated vehicle washing system.

Brushes

The present invention in one aspect comprises a brush including a hub and a plurality of bristles attached thereto. Each bristle includes an elongated shaft extending from a proximal end to a distal tip. Each bristle has the proximal end attached to the hub. The bristles extend from the hub at an acute angle to a central axis of the hub. Each bristle has an array of multiple cleaning structures extending outwardly from the shaft. The hub and/or the bristles may form a locking structure, such as an annular recess configured to be received within a complementary component, such as a locking collar or an aperture in a support structure.

Brush Components

Figure 1:
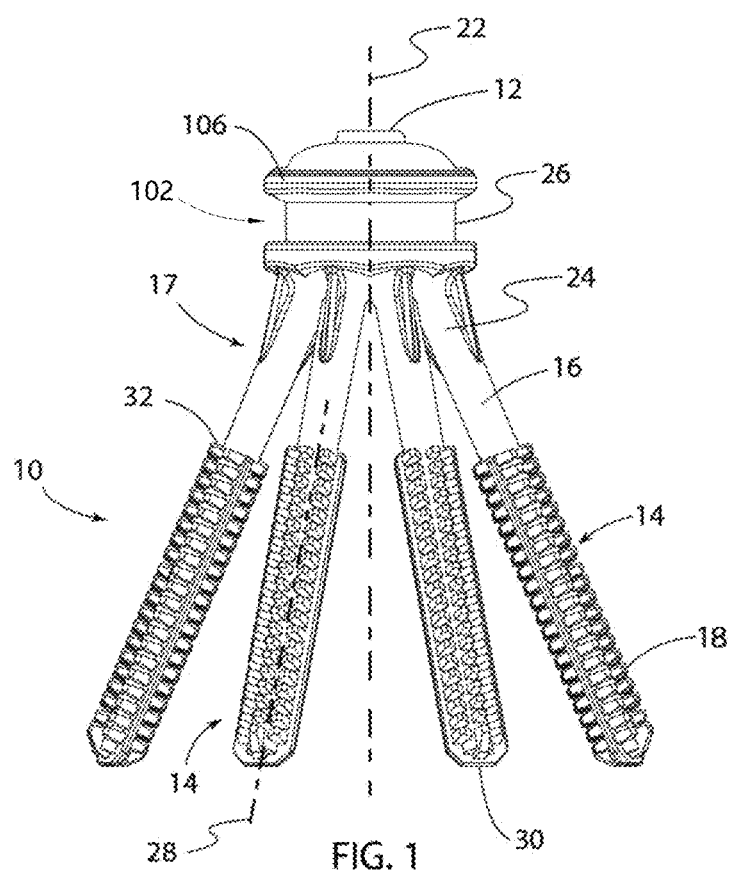
FIG. 1 is a side, elevational view of a Formed Brush in accordance with an embodiment of the present invention.
Figure 2:
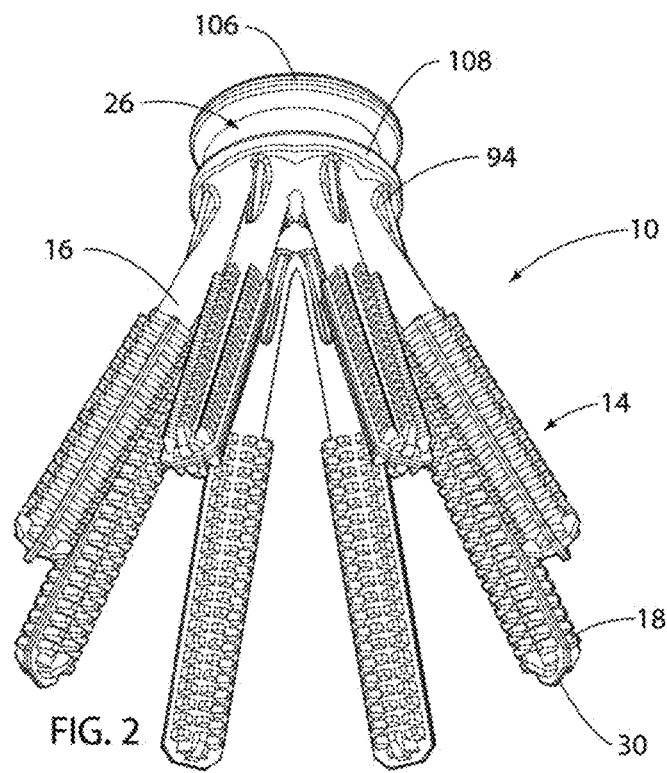
FIG. 2 is a perspective view of the Formed Brush of FIG. 1.
Figure 3:
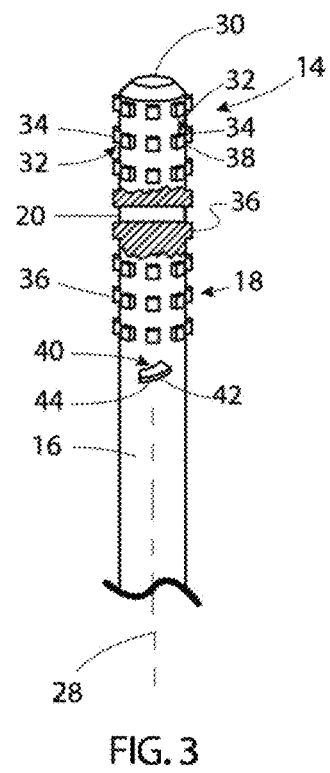
FIG. 3 is a partial, perspective side view of the distal end portion of an embodiment of a bristle with exemplary cleaning structures useful in the brushes disclosed herein.

Referring to FIGS. 1-3, there is shown an embodiment of a brush 10 of the present disclosure. Brush 10 includes a hub 12 and several bristles 14 extending from hub 12. The bristles preferably extend in a radial direction from the hub. Each bristle comprises a shaft 16 attached at a proximal end 17 to hub 12, and carrying a number of cleaning structures 18 which may have varying numbers, shapes and locations. Bristles 14 may also contain through holes 20 spaced along shaft 16.

In an embodiment, hub 12 includes a central axis 22, and shafts 16 extend parallel to or at an angle to central axis 22. In an embodiment, the bristles extend at an outward, acute angle of no more than 45°, preferably 15°-35°. The bristles may be positioned symmetrically or asymmetrically about central axis 22. Wedge-shaped gussets 24 may be provided to strengthen the positioning of the shafts. A locking structure 26, shown as an annular recess, may be provided to facilitate attachment of hub 12 to a support structure.

Bristles

In accordance with the present invention, a bristle 14 comprises a shaft 16 carrying a variety of cleaning structures 18. The term "shaft" refers to an elongated member which is generally linear in shape and may include a central axis 28 and a distal tip 30. The bristles may be straight, curved, angled or combinations thereof.

The shaft of each bristle includes a proximal end 17 secured to the hub. The shaft may extend from the hub at a range of angles, and a variety of such angles may be used for a given brush. The angles are selected based on the intended use of the brush. The angle(s) are also selected to ensure that the bristles are positioned to move effectively relative to nearby bristles. Typically, the bristle shafts will extend at an angle in the range of 0° to 45°, preferably 15° to 35°, relative to the central axis 22 of the hub.

The shaft is formed from a durable material which is suitably pliant and resilient for holding the cleaning components adjacent a surface to be cleaned. The shaft may have any cross section that provides the desired strength and flexibility. For example, the cross section may be an irregular or regular shape, and it may vary along the length of the shaft. A "regular" cross section refers to one which comprises a cross section that has the shape of a regular polygon. Preferred cross-sectional shapes include round, oval, square, pentagonal, hexagonal, octagonal, etc. In embodiments, the shaft has a number of lengthwise surfaces, for example eight in the case of an octagonal shaft, and cleaning structures may extend from each of these surfaces. The shafts may also include through holes 20, shown in FIGS. 1-2, which allow for fluid flow therethrough.

Cleaning Structures

The shafts of the bristles support a number of cleaning structures 18 extending outwardly therefrom. In embodiments, cleaning structures 18 are preferably formed integrally with the shaft, as by extrusion molding. The variety and number of such cleaning structures are selected based on the composition of the bristles and the intended use of the brush. Examples of cleaning structures are shown throughout the figures.

Nubs

One form of a cleaning structure is referred to herein as a "nub". The term "nub" refers to a relatively small diameter projection extending from the shaft with a size and position to contact a surface to be cleaned. Referring to FIG. 3, numerous nubs 32 are shown. Nubs 32 have side walls 34 extending from shaft 16 and terminating in end surfaces 36. In embodiments, the nubs extend normal to the surface of the shaft. However, nubs 32 may also extend at other angles relative to the shaft.

Nubs thereby present several surfaces for contacting and cleaning a surface, including the side wall surfaces 34 and the end surfaces 36. The junction between side walls 34 and end surfaces 36 may be smooth or rough. In one aspect, the junction between a side wall 34 and an end surface 36 is rounded, and in another aspect the junction provides a corner edge 38 which may further enhance the cleaning action of the nub.

The bristles have multiple nubs attached to each shaft. The number of nubs on a shaft may vary depending on the size of the brush, the use of the brush, and the cleaning effect desired. In embodiments, a bristle includes at least 10, at least 50, or even at least 100 nubs. The nubs may be arranged in patterns or may be irregularly positioned on the shaft. The number, shape and arrangement of the nubs may differ for different portions of a bristle. In one embodiment, the total number of individual nubs 32 per bristle 14 is approximately 120, with cleaning edges per bristle of approximately 960. In such an embodiment there are approximately 7,680 cleaning edges per brush.

Shaft Tips

Shafts 16 terminate in end portions or tips 30 which may have a variety of shapes. Shaft tips 30 thereby provide another form of a cleaning structure 18. The shaft tip may have any of a variety of shapes adapted to enhance the cleaning action of the bristle, and may include other cleaning structures as described herein. The end portion of the bristle may be pointed, rounded, or have a flat or irregular surface. Shaft tip 30 thereby provides a cleaning surface positioned to contact a surface to be cleaned.

Wiper Blades

Shaft 16 may also support one or more wiper blades 40. The term wiper blade refers to a component extending from the shaft in a position to act in the manner of a scraper of the surface to be cleaned. Along with the nubs, the wiper blades provide excellent cleaning, and help in retaining the chemical solution during the washing process. Referring to FIG. 3, wiper blade 40 comprises a wall-like structure which includes side walls 42 extending outwardly from shaft 16 and terminating in a contact surface 44. Contact surface 44 may be positioned such that the nubs extend outwardly from the shaft either more, the same, or less, than contact surfaces 44 of wiper blades 40. The positions of the contact surfaces of the wiper blades relative to end surfaces 36 of nubs 32 may vary within the same bristle.

In embodiments, the bristles include more than one wiper blade, preferably two or more wiper blades, located along the shaft. The contact surfaces of the wiper blades may be variously oriented relative to the longitudinal axis of the shaft. For example, the contact surface of a wiper blade may be parallel to or angled from longitudinal axis 28 of shaft 16. The wiper blades of a bristle may vary in number and in position along the length of the shaft. Also, the wiper blades may be located adjacent to or nested within the nubs, or may be located spaced from the nubs.

Other Cleaning Structures

Figures 4, 5, 6, 7, 8, 9:
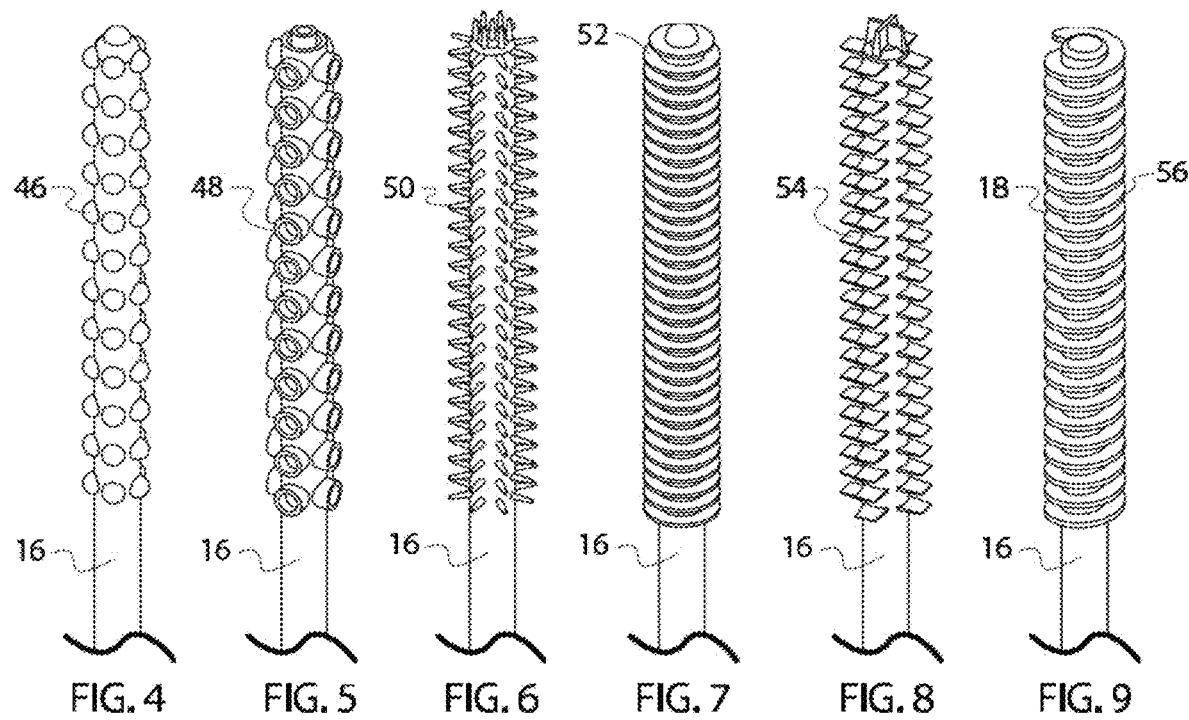
FIG. 4 is a perspective, side view of the distal end portion of an alternate embodiment of a bristle showing cleaning structures comprising rounded nubs.
FIG. 5 is a perspective, side view of the distal end portion of an alternate embodiment of a bristle showing cleaning structures comprising cup-shaped cleaning nubs.
FIG. 6 is a perspective, side view of the distal end portion of an alternate embodiment of a bristle showing cleaning structures comprising needle-type nubs.
FIG. 7 is a perspective, side view of the distal end portion of an alternate embodiment of a bristle showing cleaning structures comprising wafer-type cleaning nubs.
FIG. 8 is a perspective, side view of the distal end portion of an alternate embodiment of a bristle showing cleaning structures comprising pad-type cleaning nubs.
FIG. 9 is a perspective, side view of the distal end portion of an alternate embodiment of a bristle showing cleaning structures comprising a corkscrew nub.

The cleaning structures 18 may further comprise a wide variety of other regularly or irregularly shaped structures. Referring to FIGS. 4-9, there are shown a number of different cleaning structures located on shafts 16. FIG. 4 is a perspective view of a bristle having rounded nubs 46. FIG. 5 is a perspective view of an embodiment of a bristle structure having flexible tentacle-type, cup-shaped cleaning nubs 48. FIG. 6 is a perspective view of an embodiment of a bristle structure having flexible needle-type cleaning nubs 50. FIG. 7 is a perspective view of an embodiment of a bristle structure having flexible wafer-type cleaning nubs 52. FIG. 8 is a perspective view of an embodiment of a bristle structure having flexible, pad-type cleaning nubs 54. FIG. 9 is a perspective view of an embodiment of a bristle structure having flexible, corkscrew-type nub 56.

Figure 10:
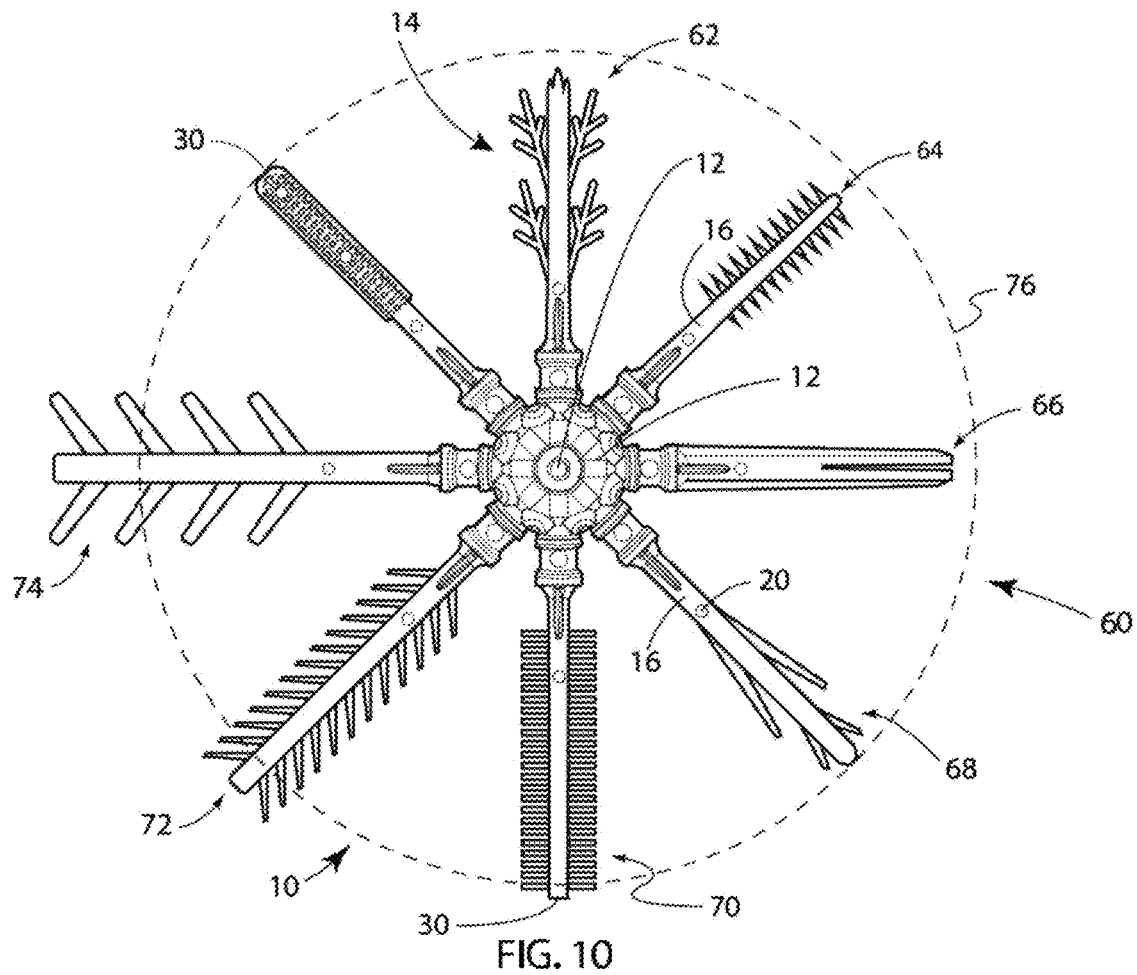
FIG. 10 is a plan view showing additional alternate embodiments of bristles useful in the disclosed brushes.

FIG. 10 further represents the capabilities of injection molding uniquely designed bristles. FIG. 10 is a plan view of bristles having a variety of additional types of cleaning structures. Shown in FIG. 10 is a brush 60 having eight different types of bristles with different diameters, lengths, nubs, wiper blades, etc. For example, FIG. 10 depicts bristles having such structures as a tree branch shape 62, a coarse comb 64, a forked wiper blade 66, a tapered branch 68, a dense comb 70, fine tapered fins 72, and coarse tapered fins 74, all integrally connected. The varying lengths of the individual bristles are shown by comparison to radius 76.

Brush Materials

The components of the brushes may be formed from a variety of suitable materials. In a preferred embodiment, thermoplastic media and/or thermoset media are used. These materials have a generally rubbery, soft touch and feel, are highly flexible and shock absorbing, are chemically resistant, are resistant to Ozone, have high elasticity, and can be recycled. Materials such as low-density polyethylene (LDPE), high density polyethylene (HDPE), and reinforced PVC, to name a few, also provide excellent composited brush structures. Examples of materials also include any and all polymer alloys, such as thermoplastic polyurethane (TPU), thermoplastic elastomers (TPE), and thermoplastic vulcanizate (TPV).

The parts of the brush may need some stiffness and or "extra" strength in the hub area for some designs. This may be obtained from "two shot molding", which involves sequential injection of a hard polymer followed by an over-molding of a soft polymer. This brings the mixed physical properties together in one part. This may also be done with insert molding where a previously molded part is inserted into an open mold and when the mold is closed a different polymer is shot over or around the inserted part giving the two-tone effect of different properties. This adds strength and durability to a soft exterior part by providing a hard, internal part via molding.

An example of a good quality co-polymer thermoplastic media bristle brush as described herein is formed from injected molded TPV produced by ExxonMobil Chemical Company and having the following properties:
- a specific gravity of approximately 0.930;
- an approximate density of 0.930 g/cm3;
- an approximate 35-45 shore A hardness;
- a compression set of approximately 8-10% (23° C.);
- an elongation at break of approximately 350%-450% (23° C.);
- a tensile strength at break of approximately 420-580 psi (23° C.); and
- a tensile stress at break of approximately 420-580 psi (23° C.).

The TPV has excellent wear characteristics and has many superior abrasion resistant qualities including that it is: highly flexible; naturally hydrophobic; self-cleaning; non-marking; highly resistant to chemicals; polyolefin based; and recyclable within the manufacturing process. The injection molding process has a fast injection rate with rear, middle, and front processing temperatures of approximately 350° to 400° F.; mold temperature of approximately 75°-125° F.; nozzle temperature of approximately 365°-410° F.; processing melt temperature of approximately 290°-420° F.; screw speed of approximately 100-200 RPM's, and a screw compression ratio of approximately 2.0:1 to 2.5:1. Clamp tonnage is approximately 3.0 to 5.0 tons/in$^2$.

Brush Production

The brushes of the present disclosure may be formed in various manners. In one approach, the brush components are formed separately and then combined. In another approach, at least some of the brush components are formed as integral units. In a preferred embodiment, all of the brush components are formed as an integral unit. As used herein, the term "integral" refers to the components comprising a single, unitary structure, such as obtained by injection molding or 3D additive manufacturing.

The brushes in one embodiment are produced by assembling separate components, or by molding the brushes as integral components. In this respect, the brushes may be referred to as "Formed Brushes".

Folded Brushes

Figure 11:
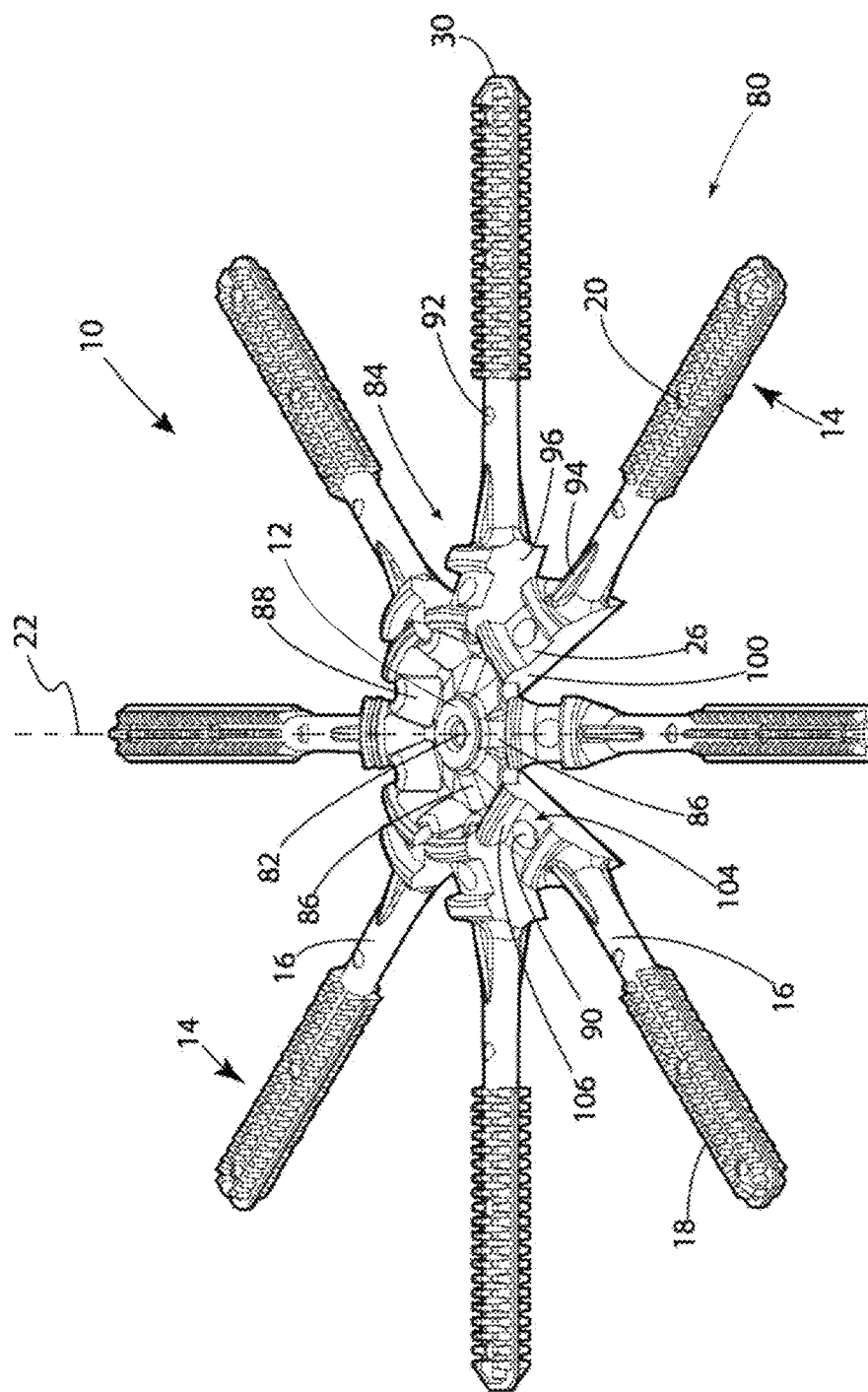
FIG. 11 is a perspective view of the exterior side of a brush precursor in accordance with the present invention, with the bristles in a first position relative to the hub.

In embodiments, the brushes are formed from a brush precursor 80. The brush precursor includes a hub and bristles which are integrally formed in a generally planar shape, as shown in FIG. 11. The brushes are formed by folding the bristles of the brush precursor relative to the hub. Brushes produced by folding a brush precursor may be referred to herein as "Folded Brushes". The brush precursor may include any or all of the same components as the previously described brushes, and the corresponding components are identified using like numbering. Unless indicated otherwise, features of the present invention may be applied to either Formed Brushes or Folded Brushes.

In a particular aspect, the hub and bristles of the brush are injection molded to form the brush precursor. The bristles are then repositioned relative to the hub to provide the bristles at the desired angle(s) to the hub. The brush precursor initially has the bristles in a first position relative to the hub, in which, for example, the bristles are oriented relative to the central axis of the hub to facilitate injection molding of the bristles in unison with the hub. To facilitate molding, the hub may have a planar configuration and the bristles are formed in a first position extending in a coplanar fashion with the hub. That is, the attachments of the bristle shafts define a plane with the hub, and the bristles extend in the plane orthogonal to the central axis of the hub.

The bristles are then moved to a second position extending at an angle to the central axis of the hub. For example, in a preferred embodiment the bristles are folded relative to the hub to form a brush having the bristles in the second position. In the second position, the bristles may extend parallel to or at an angle to the central axis of the hub. The resulting Folded Brush may comprise any of the features associated with a Formed Brush, and vice versa. For example, a Formed Brush and a Folded Brush may both have a "squid-like" appearance with the bristles extending at an acute angle of not more than 45°, such as 15° to 35°, relative to the central axis of the hub. For this reason, the brushes of the present invention are also sometimes collectively referred to as the SQUID™ brushes.

FIG. 11 shows a perspective view of the exterior side of a brush precursor 80 as obtained from a mold. This is the side which will form the exterior of the brush when the bristles are folded together. The hub and bristles are shown in FIG. 11 in a first, unfolded position in which the bristles extend radially from the hub in a plane orthogonal to the central axis of the hub. The brush may include any number of bristles which are preferably, but not necessarily, positioned equiradially.

Hub 12 is cylindrical in shape and has a central axis 22. The center of the hub may be solid (FIG. 10), or may include a central aperture 82 (FIG. 11), which may be used, for example, to receive fluid tubing or nozzles. A plurality of bristles 14 include elongated shafts 16 which carry multiple cleaning structures and extend from a proximal end 84 to the distal tip 30. The proximal ends 84 of the bristles 14 are attached to the hub by radially-spaced connectors 86. Connectors 86 define intervening open spaces 87 which facilitate the folding of the bristles relative to the hub. The bristles are attached by radially arch-shaped webbing 88 which secures adjacent bristles, but which is flexible and further allows for folding of the bristles.

Figure 12:
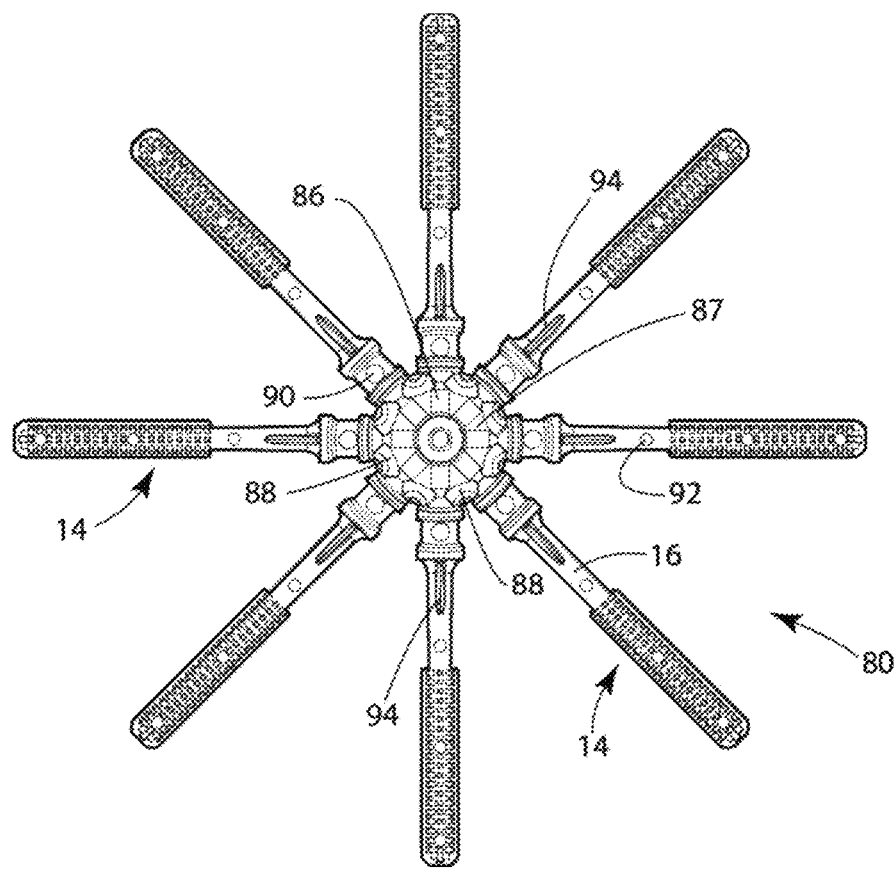
FIG. 12 is a plan view of the exterior side of the brush precursor of FIG. 11.
Figure 13:
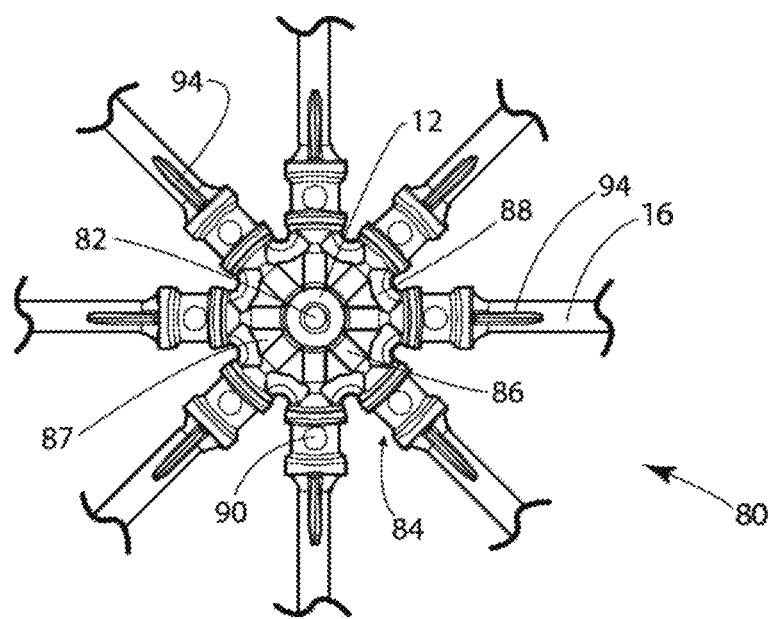
FIG. 13 is a partial, enlarged plan view of the central portion of the exterior side of the brush precursor of FIG. 12, showing the hub and proximal ends of the bristles.

The brush precursor 80 is preferably molded as a single, integral unit. As shown in FIG. 12, the brush precursor includes molding ejection pin locations 90 and 92 on each bristle. Having a significant number of combined mold ejector pin locations 90 and 92 provides for exceptionally fast and precise production output of the planar brush precursors. The ejector pin areas are purposely positioned on the same horizontal plane as the bristle's wiper blade 40. The core of the hub has an increased molded material thickness area for added structural strength in supporting the bristles. Also visible in FIGS. 11-12 are braces 94, which strengthen the support of the bristles.

Figure 14:
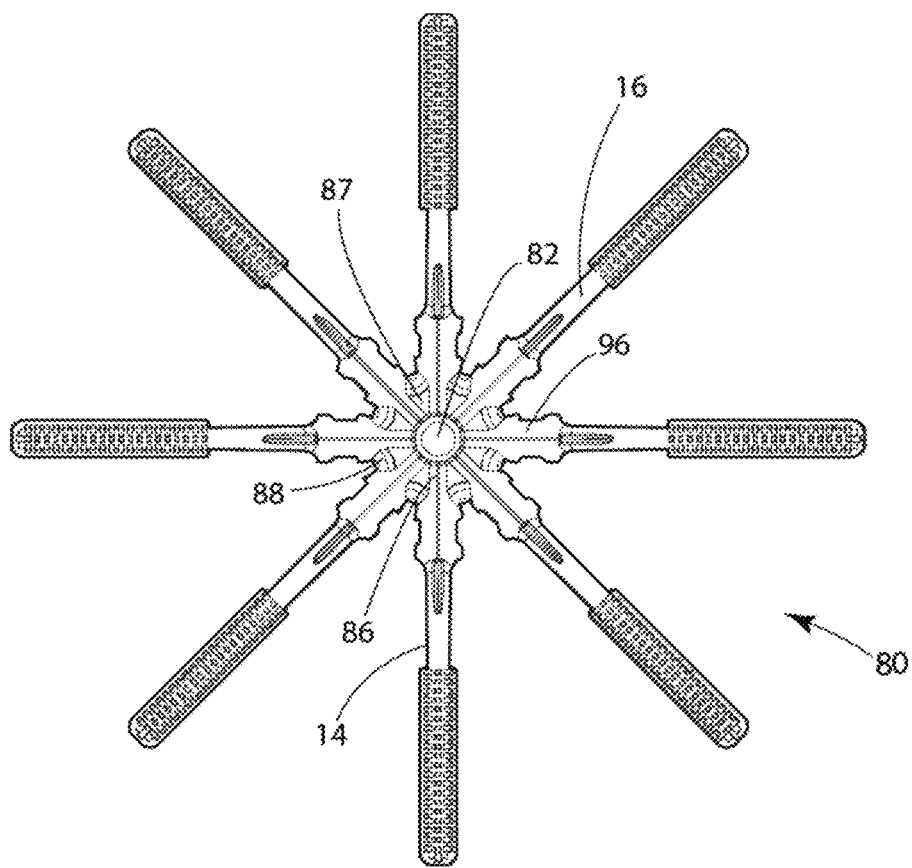
FIG. 14 is a plan view of the interior side of the brush precursor of FIG. 11.
Figure 15:
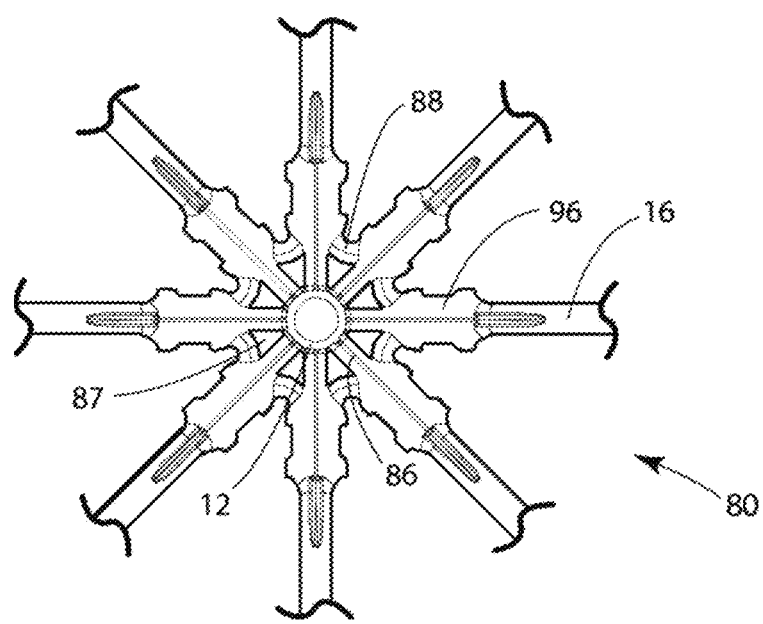
FIG. 15 is a partial, enlarged plan view of the central portion of the interior side of the brush precursor of FIG. 14, showing the hub and proximal ends of the bristles.
Figure 16:
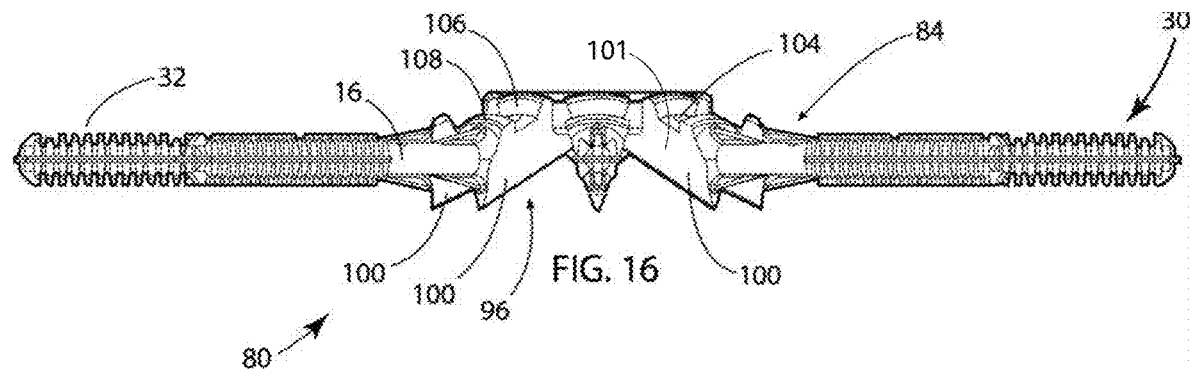
FIG. 16 is a side, elevational view of the brush precursor of FIG. 11.

FIGS. 14-15 show plan views of the interior side of the brush precursor with the bristles in the first position. FIG. 16 is a side, elevational view of the brush precursor with the bristles in the first position. These views show wedge-shaped gussets 96. The gussets are configured to facilitate formation and support of a brush formed from the brush precursor, as hereafter described.

Figure 17:
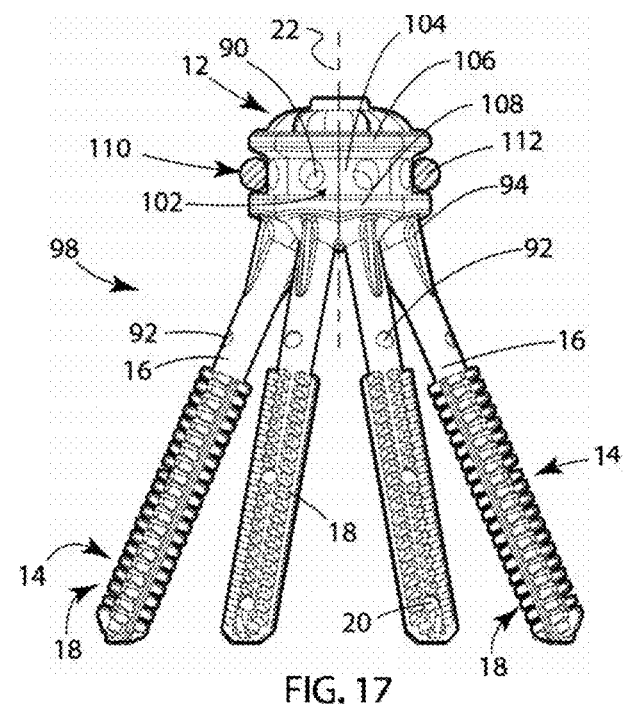
FIG. 17 is a side elevational view of a brush formed from the folding of the bristles of the brush precursor of FIG. 11.
Figure 18:
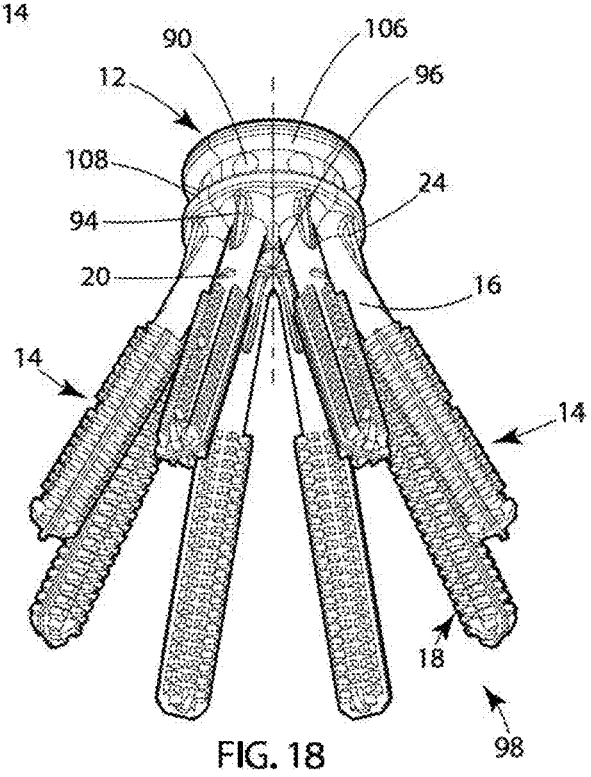
FIG. 18 is a perspective view showing the interior of the Folded Brush of FIG. 17.
Figure 19:
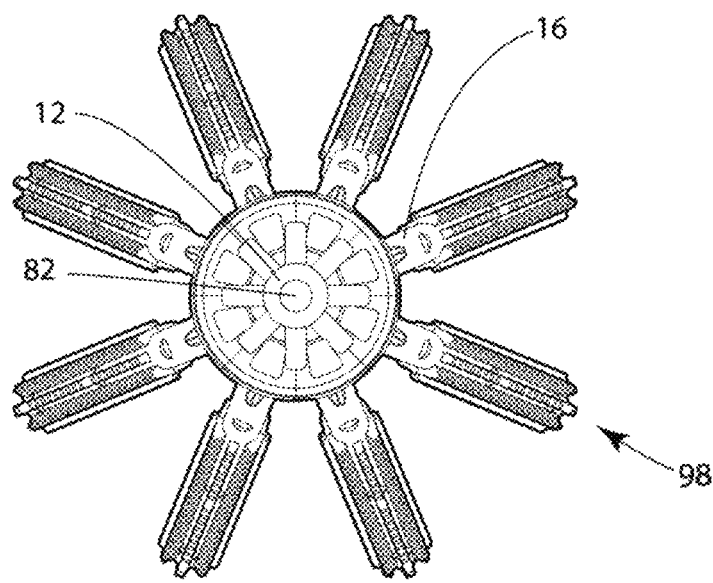
FIG. 19 is a top, plan view showing the exterior of the Folded Brush of FIG. 17.

The bristles of the brush precursor are folded inward from the first position to the second position to form a Folded Brush 98. Referring to FIGS. 17-18, a Folded Brush 98 is shown with the hub and bristles in the second position in which the bristles extend at an acute angle relative to the central axis 22 of the hub 12. As previously noted, in a preferred embodiment the hub is integrally molded with the bristles and the hub, and the bristles are moved from the first position to the second position by folding the bristles relative to the hub. More preferably, the hub has a planar, cylindrical shape. The bristles in the first position extend coplanar with the hub, and in the second position the bristles extend at an angle to the central axis of the hub not greater than 45°, and preferably 15° to 35°.

Figure 20:
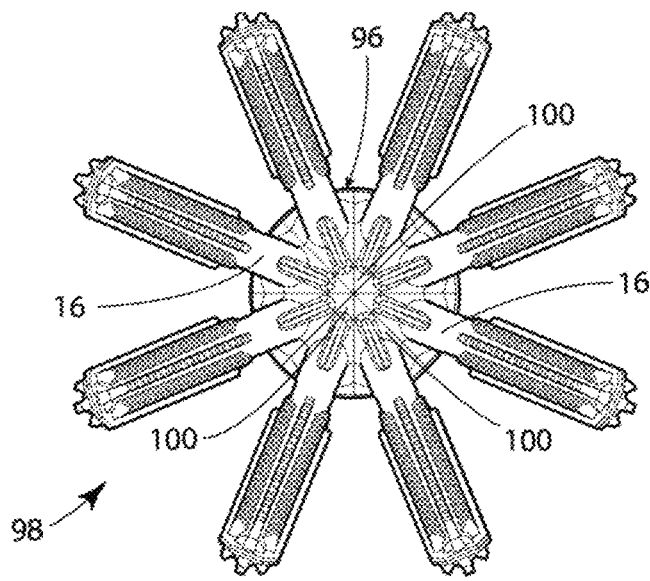
FIG. 20 is a bottom, plan view showing the interior of the Folded Brush of FIG. 17.

The brushes are easily formed by hand, or by mechanical means, by simultaneously pushing upwardly and inwardly on the interior side of the hub 12 while collectively rotating down the proximal ends of the bristles. The wedge-shaped gussets 96 are thereby brought together. As shown in FIG. 20, the wedge portions 100 of gussets 96 are configured to form a solid form when the bristles are fully in the second position. The wedge portions 100 include two angled mating faces 101 (FIG. 16) which help align, support and secure the bristles in a side-by-side arrangement upon fold-forming of the brush precursor into the squid shape. The angled faces 101 of the wedge portions 100 uniformly come together, as shown at the interior center of the Folded Brush 98 in FIGS. 18 and 20.

Locking Systems

The Folded Brushes may also include a system for locking the bristles in the second position relative to the hub. Such locking systems may be as simple as the use of an adhesive, sonic welding, or other means for directly securing the bristles together, for example by connecting wedge portions of adjacent gussets 96.

Alternatively, the bristles and/or the hub may include mechanical features that are used to secure the bristles in position. In such embodiments, separate locking members may secure the bristles together in the second position. For example, a locking collar may be applied surrounding the bristles and holding them in place. In one approach, at least one of the hub and the bristles defines a structure formed complementary to the locking member. As shown in the drawings, an exemplary complementary structure 26 may comprise an annular recess 102 defined by the hub and/or bristles. Referring to FIGS. 1 and 17, the brushes 10 and 98 are shown to have a locking structure 26 comprising an annular recess. In the Formed Brush 10, the annular recess is molded in as part of the hub, and the bristles extend therefrom. In FIG. 17, the Folded Brush 98 defines an annular recess 102 composed of aligned recesses in the bristles. Thus, referring to FIG. 11, each of the foldable bristles 14 of the brush precursor 80 includes a bristle recess 104 defined between a proximal shoulder 106 and a distal shoulder 108. Upon being folded, the bristle recesses 104 are aligned and form the complete annular recess 102.

Referring to FIG. 17, there is also shown a Folded Brush having a locking member 110 received in annular recess 102. The locking member in one form is a locking collar, which may be as simple as a ring-shaped member 112 received within the annular recess. The locking collar may be applied by assembling the collar about the brush, or the folded brush precursor can be pushed through the opening of the locking member, relying on the elasticity of the collar or of the brush to insert the brush.

In another aspect, the locking mechanism can be used to dictate the angles of the bristles in the second position. For example, the bristles of the Folded Brush may be angled based on the configuration of the locking mechanism. Considering the Folded Brush of FIG. 17, the use of a larger diameter locking collar would result in a greater bristle angle relative to the central axis of the hub. In this approach, the bristles would not have to be fully folded such that the wedge-shaped gussets contact each other.

It will be appreciated that various other mechanical configurations can operate in a similar manner. For example, the brush may instead include an annular ridge received in an annular recess of a locking mechanism. Further, other mechanical couplings providing a form fit, press fit, snap fit, or the like, can be adapted to lock the bristles in the second position.

Support Structures

The brushes may be used in a variety of ways and for a variety of purposes. For example, the Formed Brushes exemplified in FIG. 1 can be used without further modification. Similarly, a Folded Brush with the bristles locked in the second position, such as by a locking collar, are also useful in that condition. In the alternative, the brushes may be secured to a variety of support structures adapting the brushes to particular uses.

Figure 21:
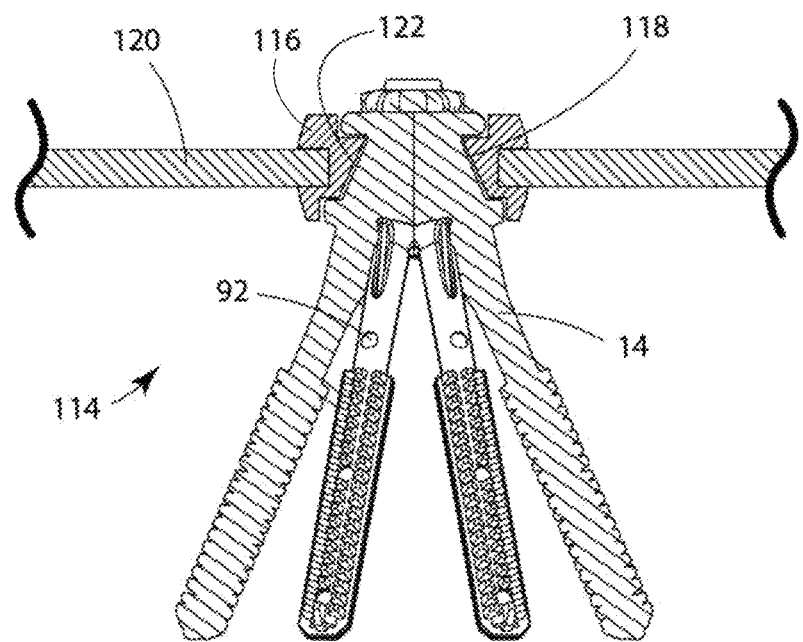
FIG. 21 is a side, partial cross-sectional view of a Folded Brush with the bristles locked in the second position by a locking collar, which is in turn received by a separate supporting structure, such as a stanchion.
Figure 22:
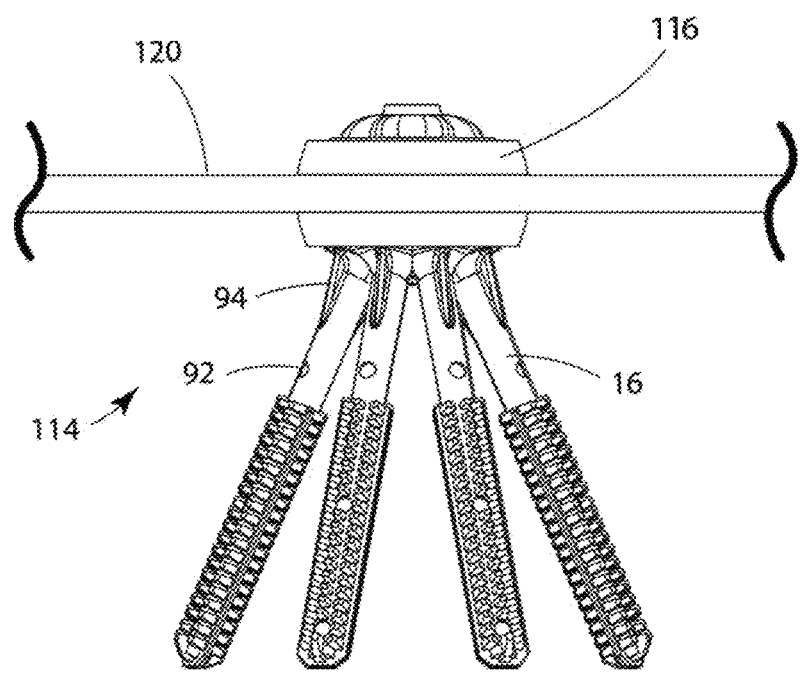
FIG. 22 is a side, elevational view of the Folded Brush, collar and support structure as shown in FIG. 21.

In embodiments, the locking structure is also used to secure the brush to a support structure. For example, FIG. 21 shows a brush 114 receiving a locking collar 116 within an annular recess 118. In this embodiment, the locking collar is used to lock the bristles in the second position, and also to secure the brush within a support structure 120. Also shown in FIG. 21 is an embodiment in which the locking collar includes a tapered surface 122 within an annular recess 118 which has a complementary shape. This embodiment further demonstrates the ability to control the angle of the bristles relative to the hub axis by using differing internal structures, e.g., tapers, of a locking member. FIG. 22 provides an elevational view of the brush and support structure of FIG. 21.

Figure 23:
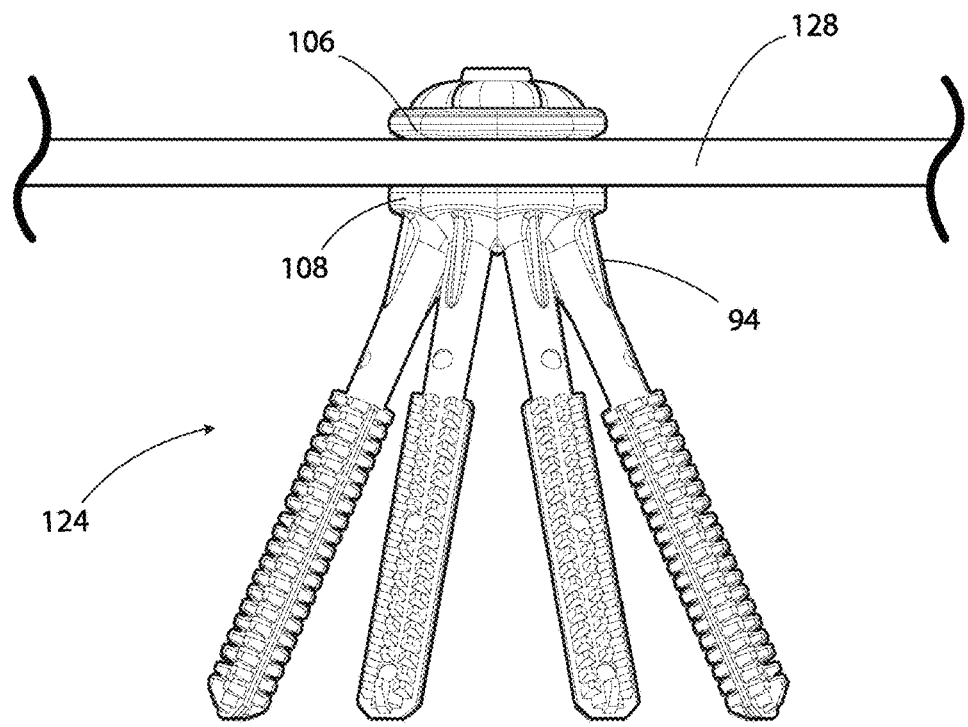
FIG. 23 is a side, elevational view of a Folded Brush having an annular recess received within an aperture in a support structure.
Figure 24:
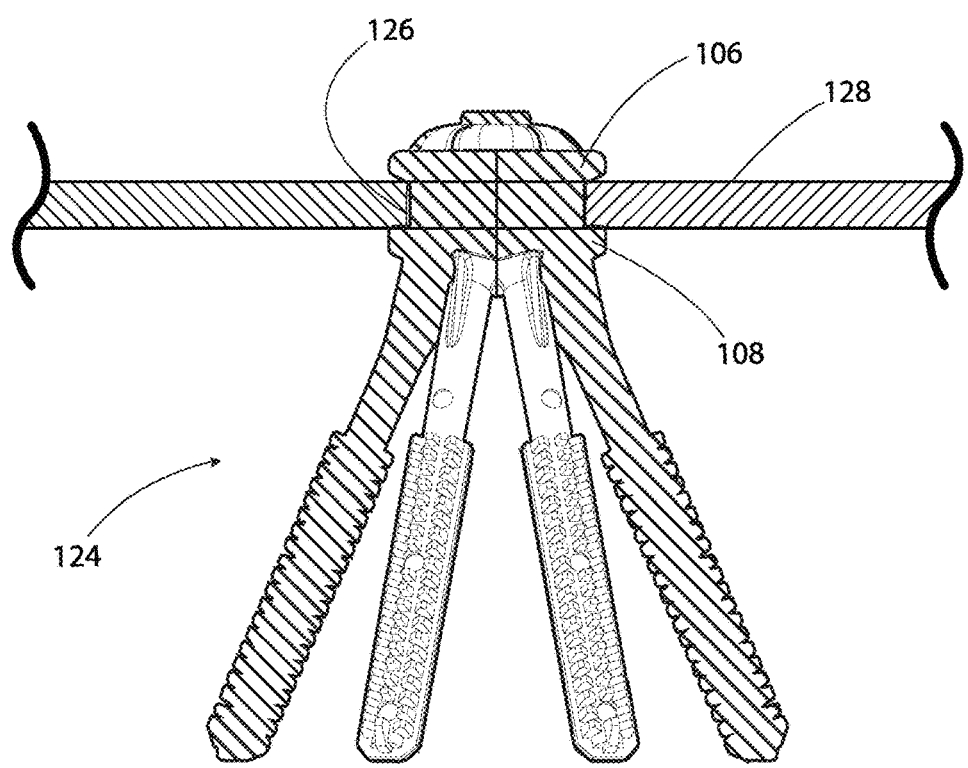
FIG. 24 is a partial, cross-sectional side view of the Folded Brush and support structure of FIG. 23.
Figure 25:
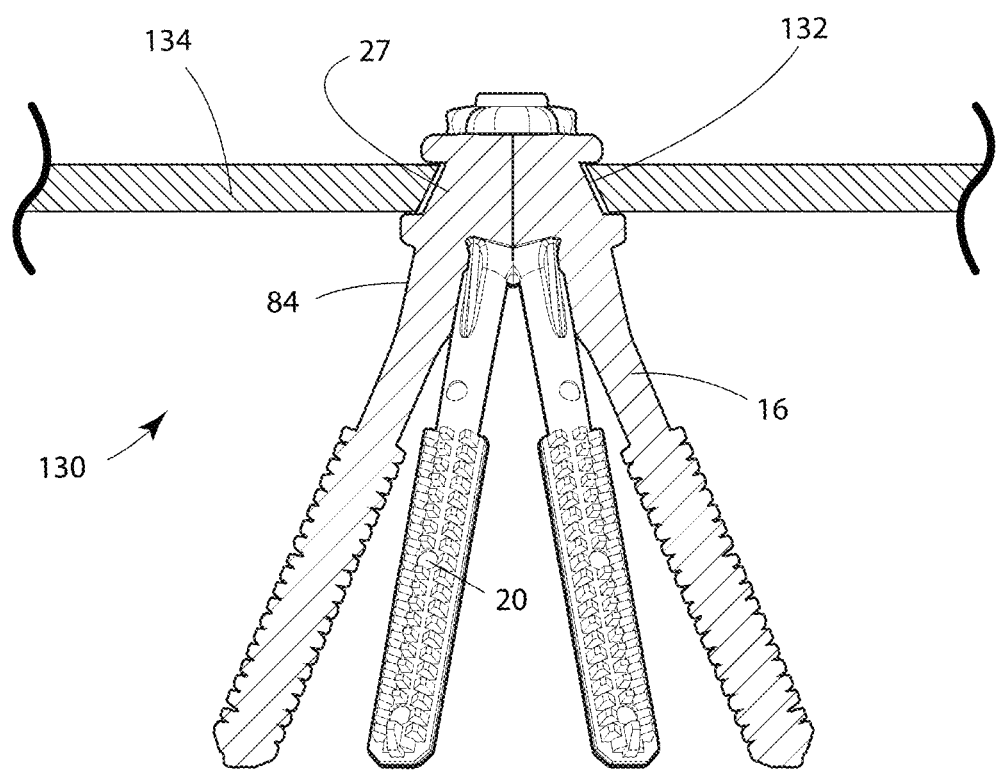
FIG. 25 is a partial, cross-sectional, side view of a Folded Brush secured to a support structure and including a tapered opening to control the angle of extension of the bristles from the hub.

In other embodiments, the folded brush may be directly inserted into a support structure which also functions as the locking mechanism. FIGS. 23-24 show a brush 124 received directly into an aperture 126 of support structure 128. The brush is form-folded and then inserted into the support structure. An additional advantage of the brush design is that it is readily inserted in either direction, either by first inserting the hub or first inserting the bristles into an aperture. In FIG. 25 there is shown a brush 130 including a tapered annular recess received in a complementary shaped aperture 132 in support structure 134. This also demonstrates that a support structure, rather than a locking mechanism, can be used to control the angle of the bristles.

Vehicle Washing

By way of example, a particular utility of the Squid Brushes is in the cleaning of vehicles. Shown in FIGS. 26-27 is the mounting of a combination of brushes in a stanchion to form a brushing apparatus for use in cleaning a vehicle or other subjects. The brushes in one aspect are carried on an elongated support structure and are arranged to be useful in washing a vehicle. The support structures preferably comprise vertically-suspended, elongated stanchions. The stanchions extend from a proximal end to a distal end, and suspended at the proximal end.

A preferred aspect is a brush apparatus comprising an array of brushes supported on a composite stanchion as shown in FIG. 26. Stanchion 140 includes an array of apertures 142 configured to receive and lock in place the brushes 144. Stanchion 140 includes an attachment end 146 provided with attachment means, e.g., apertures 148 to facilitate suspension of the stanchion and brushes in a vertical position. The stanchions comprise rigid or flexible substrates onto which the brushes are secured. The Squid brushes are securely fastened within the composited stanchion through their compression fitment within the annular recesses of the brushes defined by proximal shoulders 106 and distal shoulders 108. The stanchions may operate individually or as part of an overall system. In an embodiment, the stanchions are configured for use in washing the exterior of a vehicle.

The brushing apparatus may also provide additional components to enhance the utility of the SQUID™ Brushes. As shown in FIG. 28, brushes 144 include hubs 150 received in apertures in stanchion 140. FIG. 28 depicts the spacing of the brushes to provide for overlapping coverage of a surface to be cleaned. As the brushes are compressed against a surface, the bristles will spread in various directions, and will overlap with each other. Along with the movement of the stanchion, this provides a thorough and comprehensive contact between the brushes and the surface, thereby assuring a complete cleaning of the surface.

Also shown in FIG. 28 is the provision of auxiliary equipment useful in a vehicle washing system. Spray nozzles 152 communicate with tubing 154 and extend through central apertures 82 (FIG. 11) in brushes 144. Tubing 154 is connected with a fluid source and is operable to direct a fluid to the nozzles and out from the interior of the brush. This advantageously provides an application of a soap, rinsing solution, water, etc. at a position in close proximity to the surface being cleaned. Moreover, it dispenses the fluid in the midst of the brushes. As a result, a highly efficient and effective use of such fluids is accomplished.

In addition, other devices of interest may be positioned within or extending through the central apertures 82. By way of example, LED tubing 156 positions an LED light source 158 at the end of the central aperture. Such lighting allows for better visibility of the cleaning of the vehicle, and also can provide an interesting visual effect for persons in a vehicle being cleaned.

As known in the art, the cleaning effect of the brushing apparatus can be enhanced by having the stanchions, and therefore the brushes, move relative to the vehicle during cleaning. The type of relative movement between the stanchions and the vehicle can be varied, including up-and-down, translated, rotary, oscillating, etc. Also, the stanchion may be moved relative to a stationary vehicle, or the vehicle may be moved through a stationary vehicle washing system.

Example Vehicle Washing System

The structural and material makeup of the injection molded bristle brush can be flexibly formulated with many different specifications. By way of example, it has been found that an exemplary embodiment includes approximately eight (8) bristles with an overall length of approximately 3". The bristles have even or uneven lengths, a textured shaft diameter of approximately 0.250", and a length of approximately 1". In one embodiment, each bristle has approximately six rows, each row having approximately twenty nubs, and each nub having approximately eight cleaning edges for the remaining bristle length of approximately 2" and an overall outside diameter of approximately 0.375".

The annular recess of the brushes (upon being fold-formed into a Squid shape) has a cylindrical shape having an approximate inside diameter of 1.125" and outside proximal and distal shoulder diameters of approximately 1.375. The inside height dimension of the cylindrical shoulder is approximately 0.250".

After the brush assembly has been inserted into the stanchion's approximate 1" diameter hole and approximate 0.250 thickness, the annular recess experiences an approximate 0.065" compression throughout the shoulder area to secure its attachment to the stanchion.

Thus, in an embodiment, an aspect of the present invention is a multiple soft bristle brush assembly that is manufactured (e.g., injection molded) in a planar form which is then subsequently formed into a geometrical shape (resembling the profile of a squid). Each bristle may include a wedge-shaped, gusseted shaft with multiple projections (nubs) having cleaning edges circumferentially around the shaft. The brushes may be received in any type of support. In a particular embodiment, the brushes are mounted to a stanchion comprising an elongate material which may hold numerous brushes and which may be moved against a surface to be cleaned. The brushes preferably include a formed locking recess for simple insertion into the composited type stanchion. The stanchion contains multiple soft bristle brushes each having bristles with multiple cleaning type tips (nubs) throughout the profile of the bristles which provide continuous total brush cleaning regardless of how the bristles of the brush may deflect during the washing process.

Drum

Figure 29:
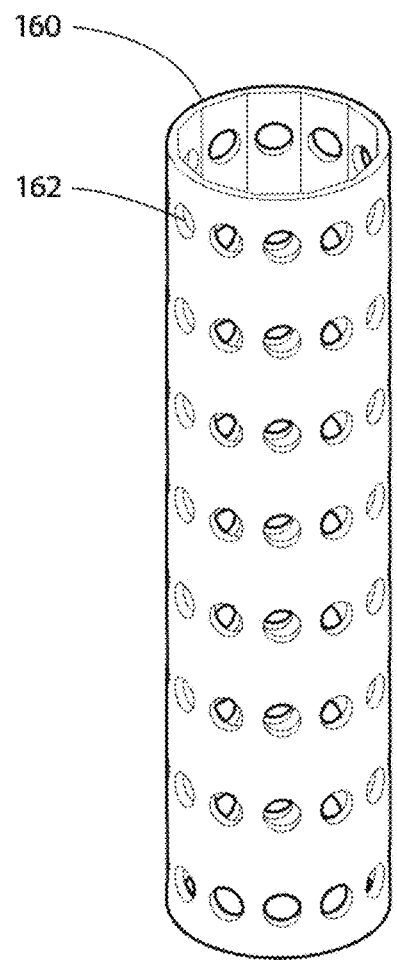
FIG. 29 is perspective view of a cylindrical stanchion with openings to receive brushes.
Figure 30:
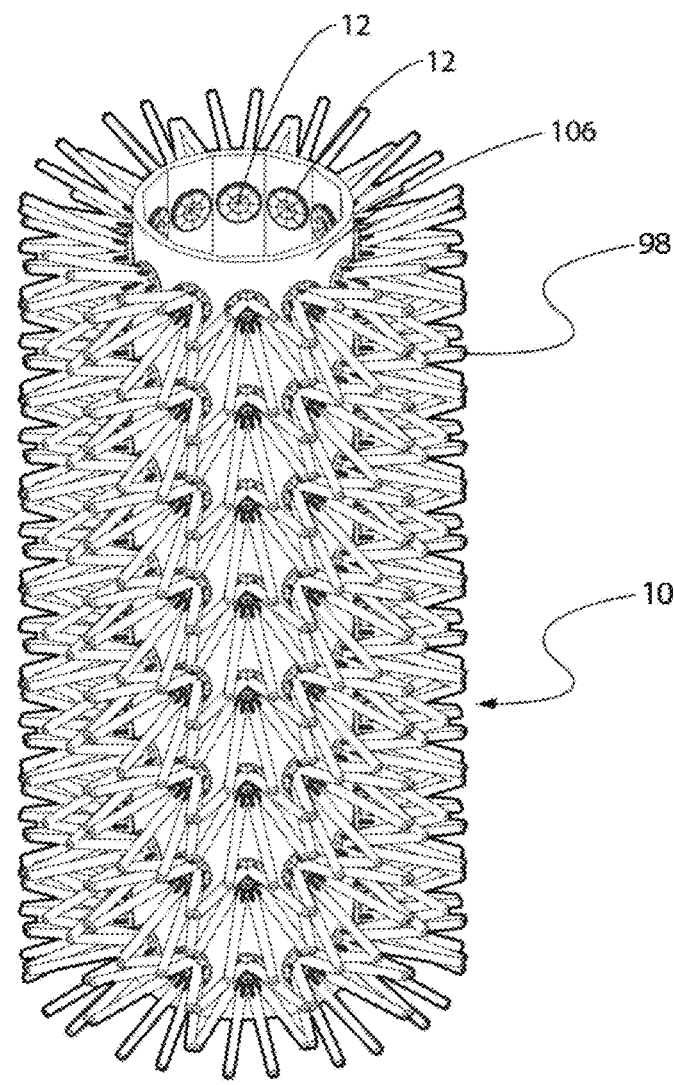
FIG. 30 is a perspective view of the cylindrical stanchion of FIG. 29 populated with brushes.

FIG. 29 shows a circular drum-type composited stanchion 160 with Squid Brush receiving apertures 162. FIG. 30 shows drum stanchion 160 populated with Squid Brushes 98. The drum stanchion can be used in conventional fashion by rotating the drum stanchion with the brushes in contact with a vehicle.

Hand Washer

Figure 31:
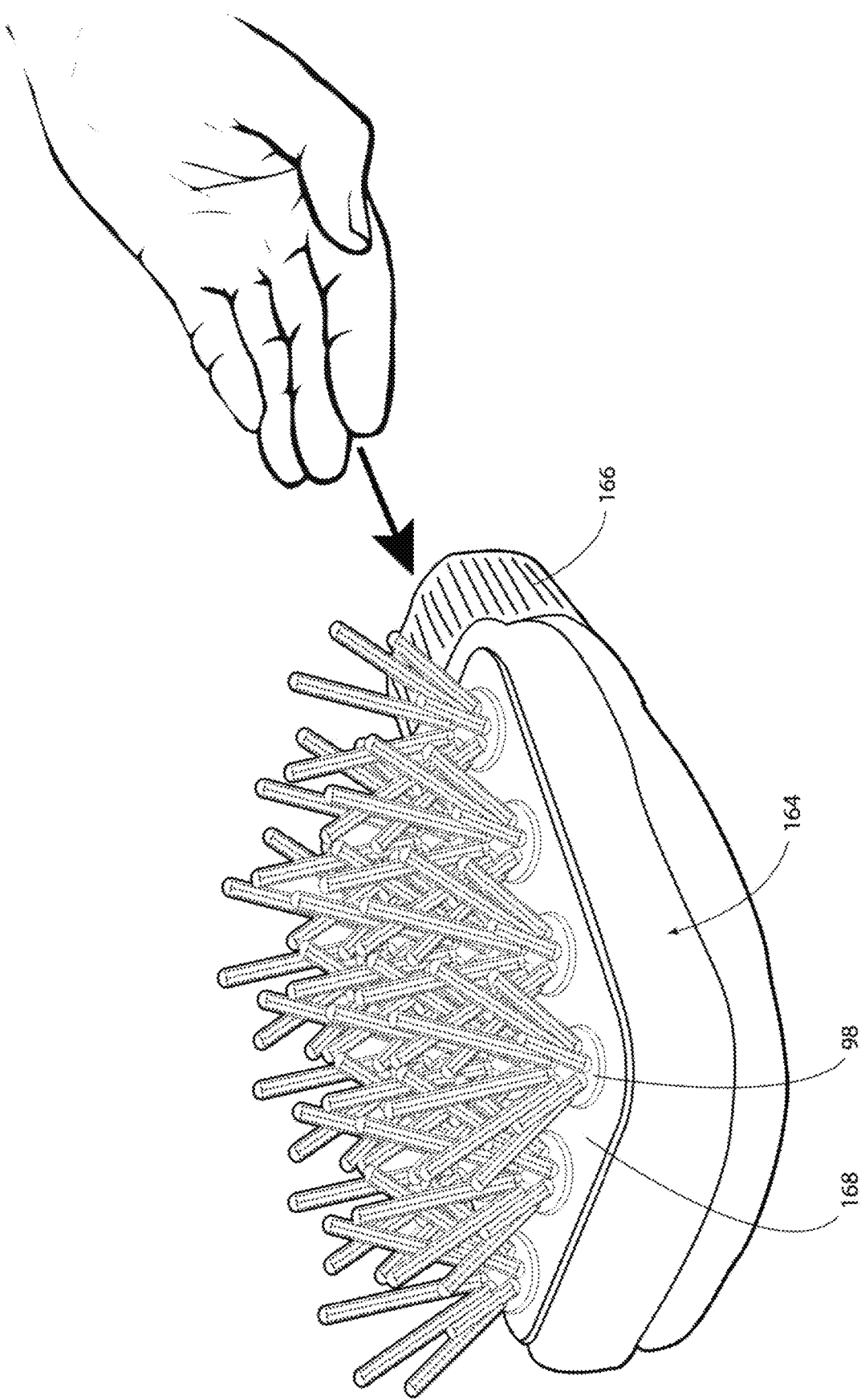
FIG. 31 is a perspective view of an exemplary embodiment of a support structure comprising a flexible washing mitt containing several brushes.

FIG. 31 shows a flexible fabric wash mitt 164 with a wrist cuff 166 having Squid brushes 98 attached to a very flexible composited support structure 168. The Squid structures and their attachments are very much the same as what has been previously described.

Dual Bristles

Figure 32:
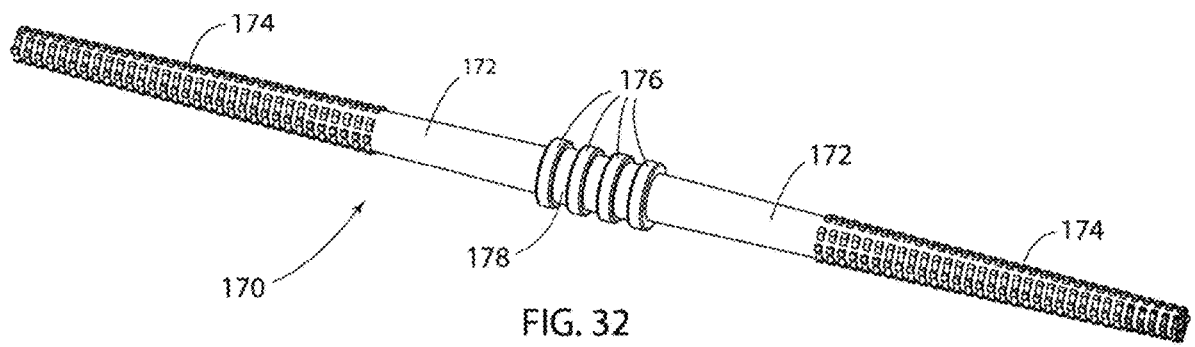
FIG. 32 is a perspective view of an injection-molded, double-ended bristle having multiple mounting positions in a support structure.
Figure 33:
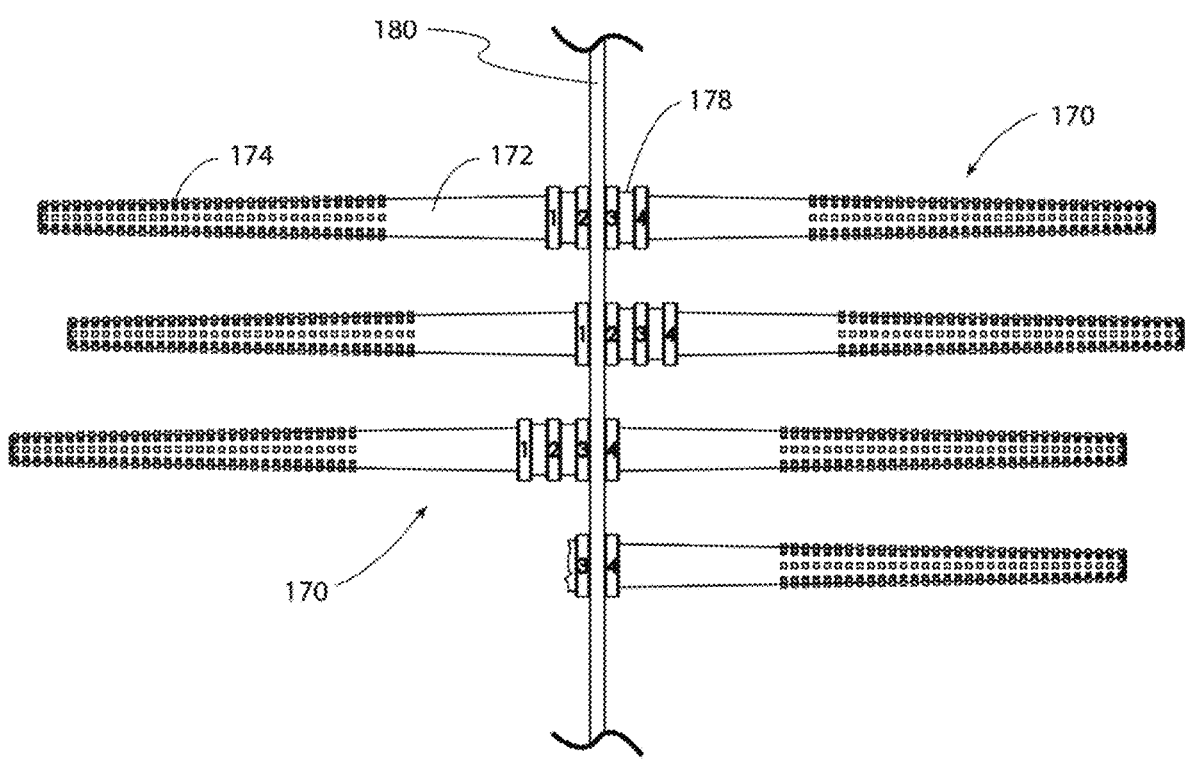
FIG. 33 is a side, elevational view of a linear stanchion showing the multiple mounting positions for the double-ended bristle of FIG. 32.

FIGS. 32-33 show injected molded single and dual bristle variations. These types of single or dual bristles have specific vehicle targeted cleaning purposes and are usually interposed with Squid bristles for targeting relatively small cleaning areas requiring a special type of vehicle washing bristle cleaning, e.g., white wall tires. The dual bristle 170 shown in FIG. 32 is formed in a longitudinal linear shape having two separate similar bristles with bristle shafts 172 and bristle nubs 174 connected in the middle by multiple rings 176 defining several annular recesses 178. The dual-bristle design allows for cleaning special vehicle exterior areas from both sides of a suspended composited support structure, e.g., the front of a moving (conveyorized) vehicle and its reverse in following the rear of the vehicle. Each separate recess 178 provides adjustment to lengthen or shorten the bristle's cleaning length as required. The use of two differently sized and shaped bristles within one molded unit, each bristle having the same or different protuberances, lengths, diameters, etc., allows for the unit to be located within a recess to provide two completely different types of bristles for two different types of required washing. FIG. 33 is a side view showing the different mounting positions for dual bristle 170 in a stanchion 180.

In embodiments, disclosed are vehicle washing devices and systems using the Squid Brushes. The devices comprise suspended linear composited stanchions which are fully populated with Squid brushes and which are generally non-rotating type. The articulating brushes achieve excellent high-resolution vehicle cleaning requiring significantly less water, chemical, and energy to operate.

The soft bristles of the Squid brushes with their circumferential cleaning edges have been shown to reach inwardly to totally clean even the toughest to reach areas of the vehicle—ledges, crevices, nooks and crannies often found with recessed windows, lights, door handles, mirrors, and grills. The washing process is extremely quiet in its operation, and almost totally eliminates the possible incidence of vehicle damage, because conventional brush rotation and required crush of the rotating brushes has been eliminated.

A vehicle washing brush apparatus and system in accordance with the present invention, provides soft bristle brushes which are self-fastening without the need for ancillary attachment parts; are light weight; are easy to assemble, install, replace, and service; and have purchase costs that are significantly reduced.

Miscellaneous Uses

Figure 34:
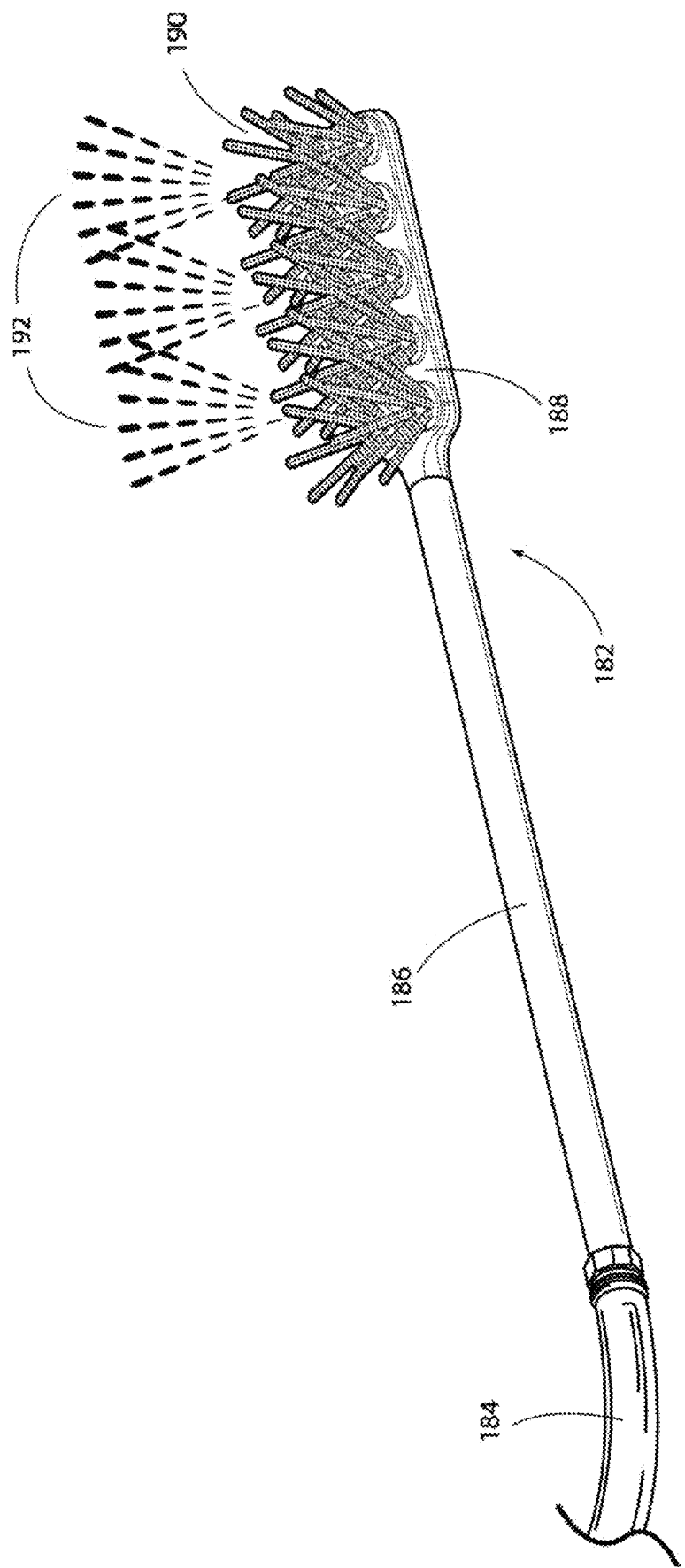
FIG. 34 is a perspective view of an exemplary embodiment of a support structure comprising a pole-extended type washing device holding a plurality of brushes.
Figure 35:
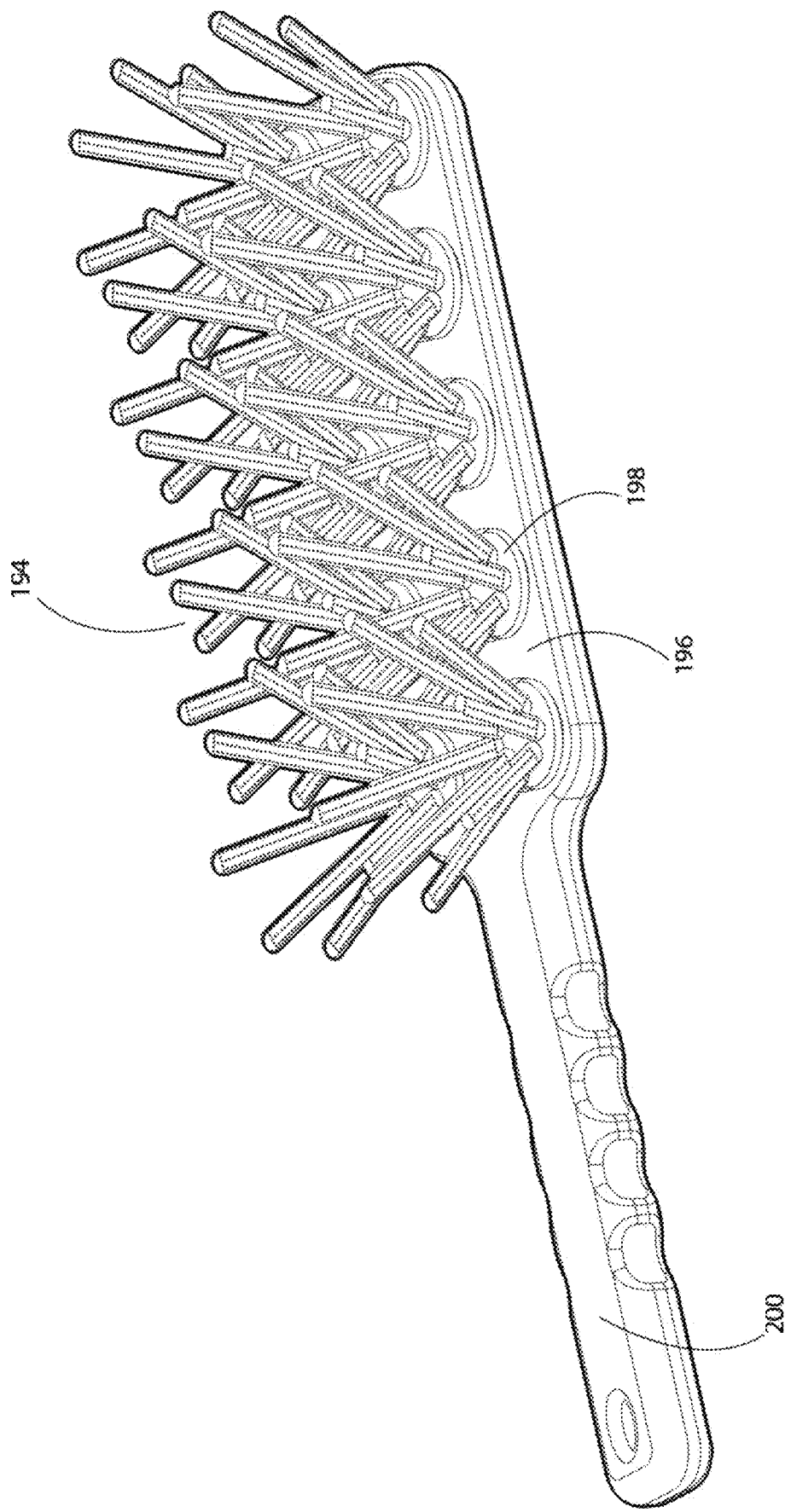
FIG. 35 is a perspective view of an exemplary embodiment of a support structure comprising a hand-held washing brush, such as used for cleaning a vehicle.

FIG. 34 shows a Squid pole brush 182 having a flexible water/solution line 184 and a rigid conduit 186 connected thereto. Fluid travels under pressure through rigid conduit 186 into a reservoir and support structure 188. Spraying of washing fluids through the Squid Brushes 190 is shown at 192, and may use nozzles as described with respect to FIG. 28. FIG. 35 shows a similar hand brush 194 comprising a support structure 196 carrying brushes 198, and including a handle 200.

Figure 36:
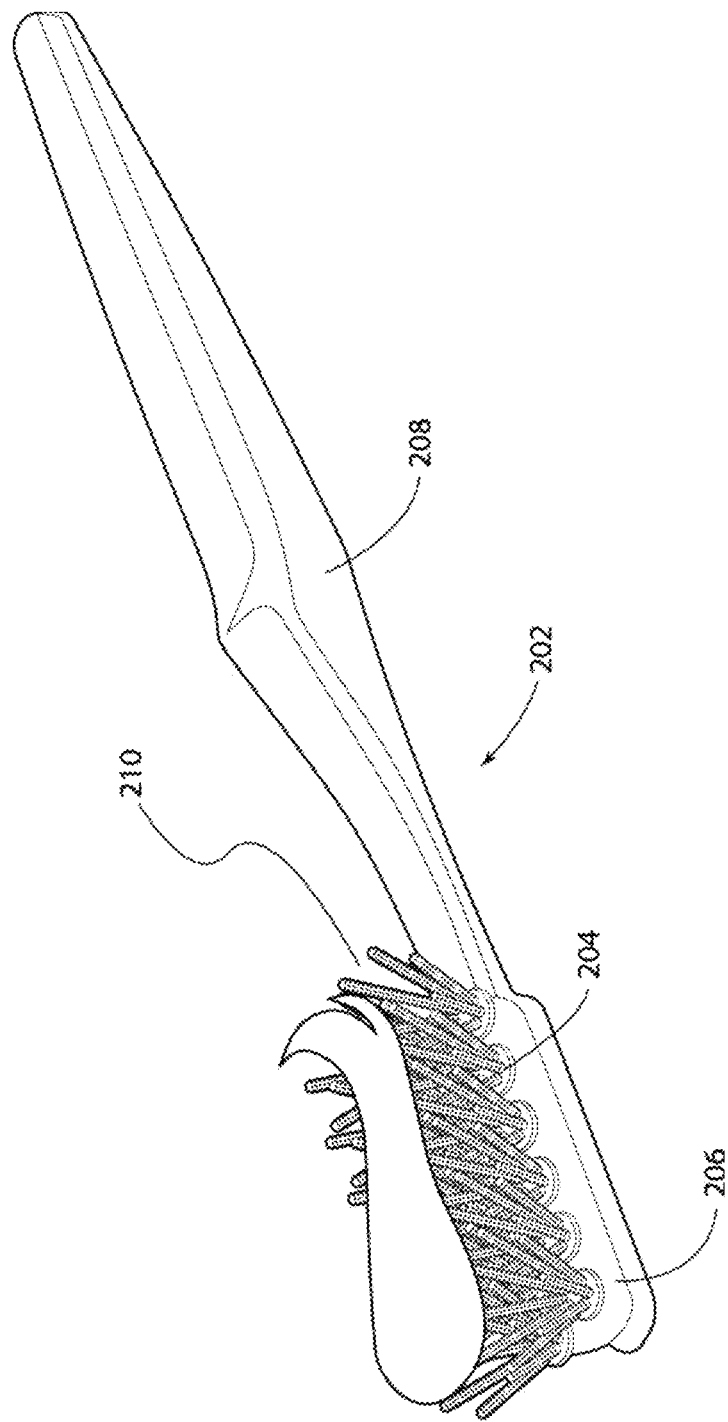
FIG. 36 is a perspective view of an exemplary embodiment of a support structure comprising a toothbrush containing a plurality of brushes.
Figure 37:
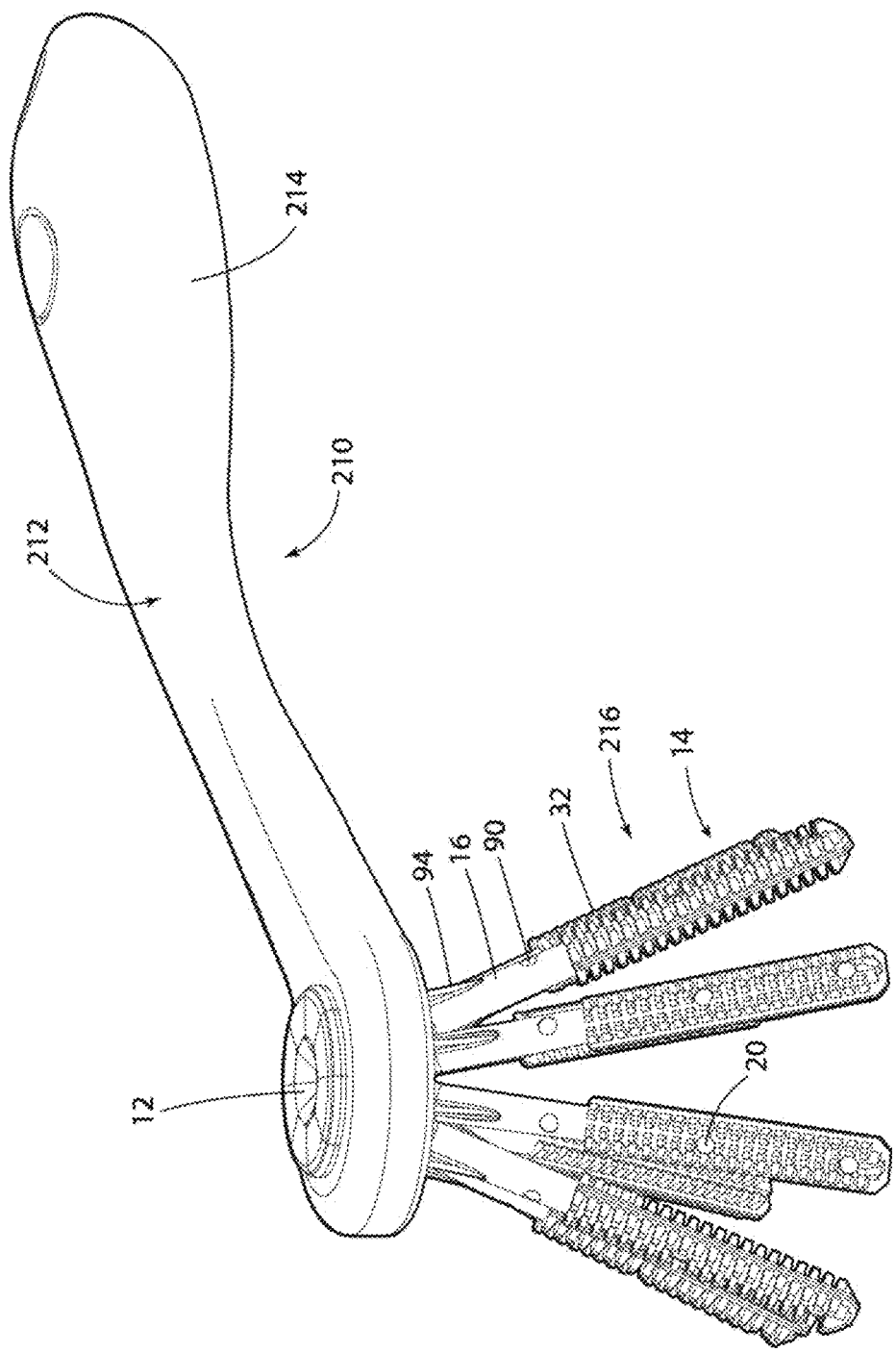
FIG. 37 is a perspective view of an exemplary embodiment of a support structure comprising a dishwashing type brush containing a plurality of brushes.

FIG. 36 shows a toothbrush 202 having brushes 204 mounted to a support structure 206 which is connected to a handle 208. FIG. 37 shows a dish washing brush 210 including a support structure 212 comprising a handle 214. Brush 216 is received within an aperture in the support structure. Mounting of the brushes to the support structures as shown in FIGS. 34-37 may be in the same manner as previously described and shown herein.

Figure 38:
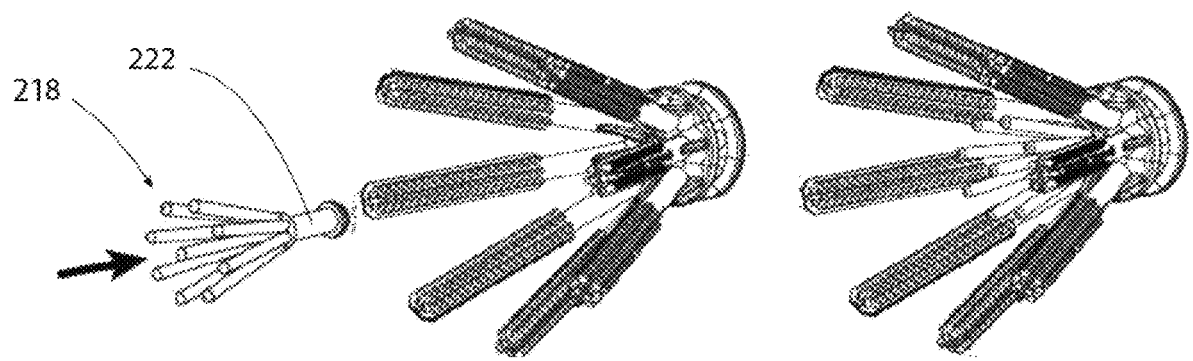
FIG. 38 is an exploded, perspective view showing the assembly of a sub-brush into a brush.
Figure 39:
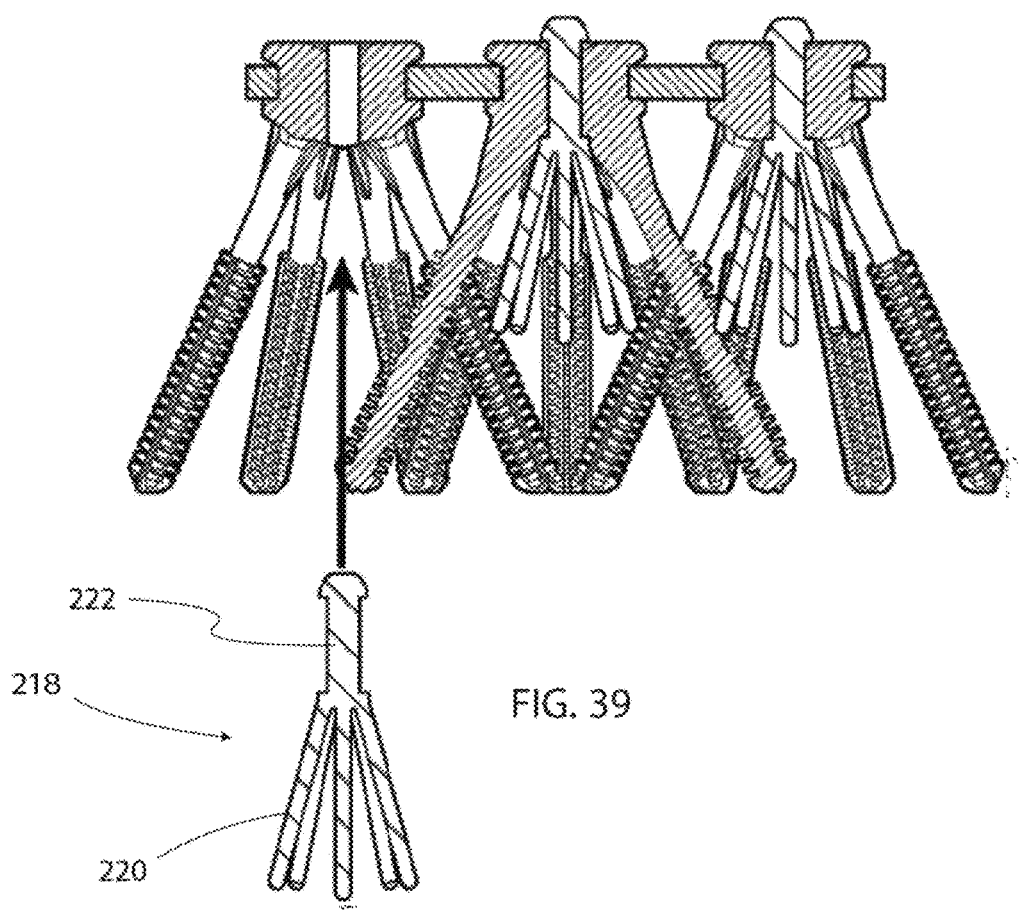
FIG. 39 is a side, elevational view, partially in cross section, showing the reception of a sub-brush into a brush.

FIGS. 38 and 39 show an additional embodiment with a smaller brush nested within a Squid Brush. Nesting brush 218 includes bristles 220 and stem 222. The stem of the nesting brush is received within the hub aperture.

| Reference Number | |
|---|---|
| 10 | brush |
| 12 | hub |
| 14 | bristle |
| 16 | shaft |
| 17 | proximal end |
| 18 | cleaning structures |
| 20 | through holes |
| 22 | central axis of hub 12 |
| 24 | gussets |
| 26 | locking structure |
| 28 | central axis of shaft 16 |
| 30 | end portion/tip |
| 32 | nub |
| 34 | side wall of a nub 32 |
| 36 | end surface of a nub 32 |
| 38 | corner edge of nub 32 |

| Reference Number -continued | |
|---|---|
| 40 | wiper blade |
| 42 | side wall of blade 40 |
| 44 | contact surface of blade 40 |
| 46 | rounded nubs |
| 48 | cup-shaped nubs |
| 50 | needle-type nubs |
| 52 | wafer type nubs |
| 54 | pad-type nubs |
| 56 | corkscrew nubs |
| 58 | |
| 60 | brush |
| 62 | tree branches |
| 64 | coarse comb |
| 66 | forked wiper blade |
| 68 | tapered branches |
| 70 | dense comb |
| 72 | fine tapered fins |
| 74 | coarse tapered fins |
| 76 | radius |
| 80 | brush precursor |
| 82 | hub central aperture |
| 84 | proximal end of 16 |
| 86 | connectors |
| 87 | open spaces |
| 88 | webbing |
| 90 | ejection pin locations (inner) |
| 92 | ejection pin locations (outer) |
| 94 | braces |
| 96 | wedge-shaped gussets |
| 98 | Folded Brush |
| 100 | wedge portions |
| 101 | gusset mating faces |
| 102 | annular recess (FIG. 17) |
| 104 | bristle recess |
| 106 | proximal shoulder |
| 108 | distal shoulder |
| 110 | locking member |
| 112 | annular ring |
| 114 | brush-FIG. 21 |
| 116 | locking collar-FIG. 21 |
| 118 | annular recess-FIG. 21 |
| 120 | support structure-FIG. 21 |
| 122 | tapered surface-FIG. 21 |
| 124 | brush-FIGS. 23-24 |
| 126 | aperture-FIGS. 23-24 |
| 128 | support structure-FIGS. 23-24 |
| 130 | brush-FIG. 25 |
| 132 | aperture-FIG. 25 |
| 134 | support structure |
| 140 | stanchion (FIG. 26) |
| 142 | apertures (FIG. 26) |
| 144 | brushes |
| 146 | attachment end |
| 148 | attachment means |
| 150 | hubs |
| 152 | spray nozzles |
| 154 | tubing |
| 156 | LED tubing |
| 158 | LED light source |
| 160 | drum stanchion |
| 162 | apertures |
| 164 | washing mitt |
| 166 | wrist cuff |
| 168 | support structure |
| 170 | dual bristle |
| 172 | dual bristle shafts |
| 174 | bristle nubs |
| 176 | rings |
| 178 | annular recesses |
| 180 | stanchion |
| 182 | pole brush |
| 184 | water line |
| 186 | rigid conduit |
| 188 | support structure |
| 190 | brushes |
| 192 | spraying |
| 194 | hand brush |

-continued

| Reference Number | |
|---|---|
| 196 | support structure |
| 198 | brushes |
| 200 | handle |
| 202 | toothbrush |
| 204 | brushes |
| 206 | support structure |
| 208 | handle |
| 210 | dishwashing brush |
| 212 | support structure |
| 214 | handle |
| 216 | brush |
| 218 | nesting brush |
| 220 | bristle |
| 222 | stem |

The invention claimed is:

1. A folded brush comprising:

a cylindrical hub having a central axis; and a plurality of bristles, each bristle including an elongated shaft extending from a proximal end to a distal tip, each bristle having the proximal end attached to the hub, each bristle having multiple cleaning structures extending outwardly from the shaft, the hub and the bristles having:
  a first position in which each of the bristles extends radially from the hub in a plane orthogonal to the central axis of the hub, and
  a second position in which the bristles extend at an acute angle relative to the central axis of the hub, in which the hub is integrally molded with the bristles, the hub and the bristles are moved from the first position to the second position by bending the bristles relative to the hub, and the hub has a planar configuration, and the bristles in the first position extend coplanar with the hub, at least one of the hub and the bristles forming an annular recess, and the brush further comprising a locking collar surrounding and received in the annular recess, the locking collar further retaining the bristles in the second position.

2. The brush of claim 1 in which the bristle shafts are cylindrical and the cleaning structures extend orthogonally from the shafts.

3. The brush of claim 1 in which each bristle contains at least 50 cleaning structures.

4. The brush of claim 1 in which the bristles extend at an angle of less than 45° to the central axis of the hub.

5. The brush of claim 1 in which the bristles in the second position extend at an angle of 15° to 35° to the central axis of the hub.

6. The brush of claim 1 in which the locking collar includes a handle.

7. The brush of claim 1 in which at least one of the hub and the bristles, in the second position, form the annular recess, the brush further comprising a flexible stanchion including an opening receiving the annular recess and holding the hub and the bristles in the second position.

8. The brush of claim 1 in which each bristle includes a wedge-shaped, gusset portion, the wedge-shaped, gusset portions in the second position being adjacent and supporting the bristles in the second position.

* * * * *